United States Patent
Law et al.

(10) Patent No.: US 7,113,221 B2
(45) Date of Patent: Sep. 26, 2006

(54) METHOD AND SYSTEM FOR CONVERTING INTERLACED FORMATTED VIDEO TO PROGRESSIVE SCAN VIDEO

(75) Inventors: Patrick Law, Milpitas, CA (US); Darren Neuman, San Jose, CA (US)

(73) Assignee: Broadcom Corporation, Irvine, CA (US)

( * ) Notice: Subject to any disclaimer, the term of this patent is extended or adjusted under 35 U.S.C. 154(b) by 534 days.

(21) Appl. No.: 10/634,459

(22) Filed: Aug. 4, 2003

(65) Prior Publication Data
US 2004/0105029 A1    Jun. 3, 2004

Related U.S. Application Data

(63) Continuation-in-part of application No. 10/289,078, filed on Nov. 6, 2002.

(60) Provisional application No. 60/452,571, filed on Mar. 5, 2003.

(51) Int. Cl.
*H04N 11/20* (2006.01)

(52) U.S. Cl. .................. 348/448; 348/459

(58) Field of Classification Search ............. 348/448, 348/458, 450–452, 459, 625, 630; 382/266; H04N 7/01, H04N 11/20
See application file for complete search history.

(56) References Cited

U.S. PATENT DOCUMENTS

| 6,396,543 B1 * | 5/2002 | Shin et al. ............ 348/452 |
| 6,891,571 B1 * | 5/2005 | Shin et al. ............ 348/448 |

\* cited by examiner

*Primary Examiner*—Sherrie Hsia
(74) *Attorney, Agent, or Firm*—McAndrews Held & Malloy, Ltd.

(57) ABSTRACT

Aspects of the invention include a 3:2 pull down detector coupled to a 3:2 cadence processor and a color edge detector coupled to a binder. The binder may be coupled to a 3:2 cadence processor. A filter, which may be a temporal or infinite impulse response filter, may be coupled to the binder. A selector may also be coupled to the 3:2 cadence processor. A memory and a processor may also be coupled to any of the 3:2 pull down detector, the 3:2 cadence processor, the color edge detector, the binder, the filter and said output selector. The selector may select between a filtered deinterlaced output and a reverse 3:2 pull down output.

22 Claims, 19 Drawing Sheets

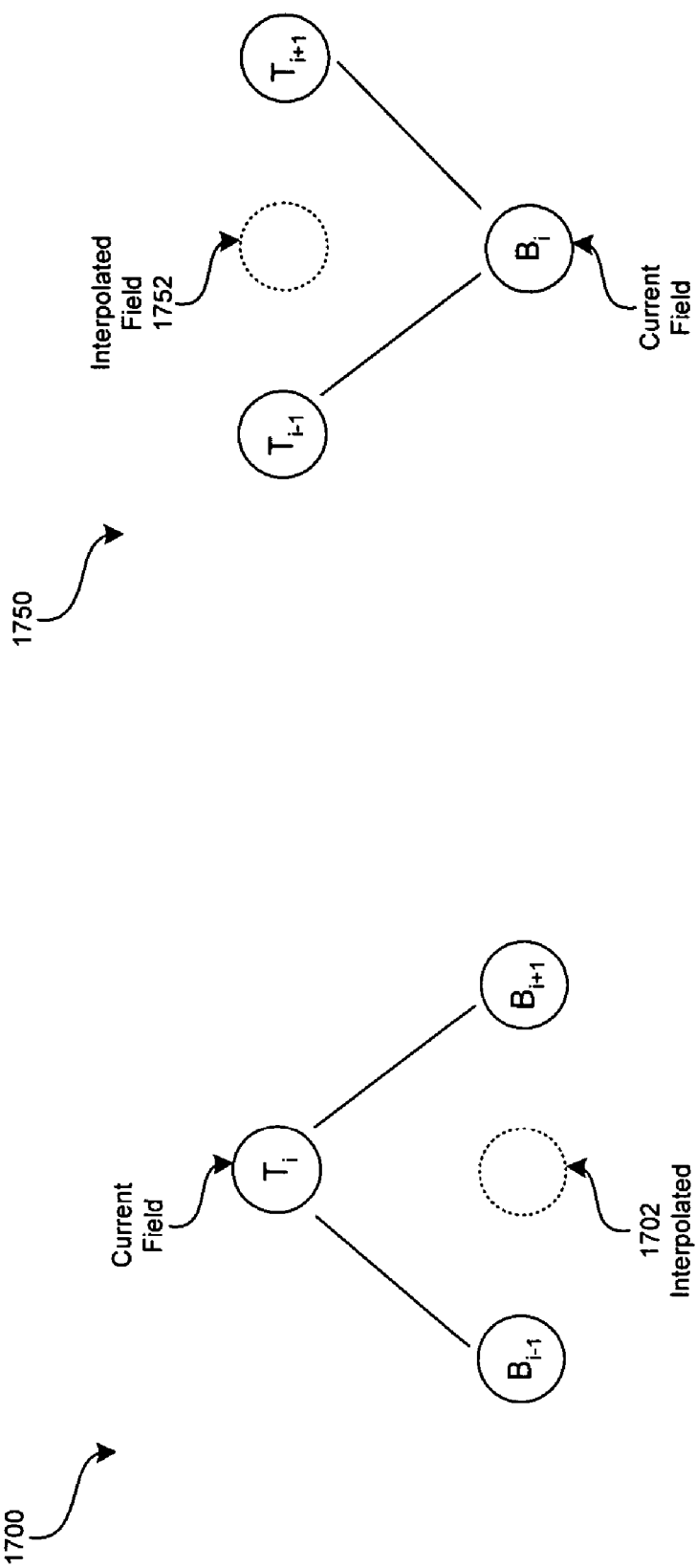

METHOD AND SYSTEM FOR CONVERTING INTERLACED FORMATTED VIDEO TO PROGRESSIVE SCAN VIDEO

CROSS-REFERENCE TO RELATED APPLICATIONS/INCORPORATION BY REFERENCE

This application is a continuation-in-part of U.S. application Ser. No. 10/289,078, filed Nov. 6, 2002.

This application also makes reference to, claims priority to and claims the benefit of U.S. Provisional Patent Application Ser. No. 60/452,571 filed on Mar. 5, 2003.

The above stated applications are incorporated herein by reference in their entirety.

FIELD OF THE INVENTION

Certain embodiments of the invention relate to the video coding schemes. More specifically, certain embodiments of the invention relate to a method and system for converting an interlaced formatted video signal to a progressively scanned formatted video signal using a color edge detection scheme.

BACKGROUND OF THE INVENTION

Video signals, for example, those providing picture display information on a television set, comprise a series of frames that are displayed at a suitable frame rate to permit persistence of vision. The frame rate may also represent the time interval that exists between successive frames. Video frames which are in the analog domain may be represented as a continuous or time varying signal. However, in the digital domain these frames may be formatted as a series of digital images.

In the United States for example, the standard power cycle for residential usage is 60 Hertz (Hz). This low bandwidth presented a problem for the displaying of video signals. Accordingly, the earliest television sets were only capable of displaying video frames at a rate of 30 frames per second (fps) due to this limited of bandwidth. In this regard, one video frame may be displayed every one-thirtieth ($\frac{1}{30}^{th}$) of a second approximately. Although 30 frames per second may be adequate for maintaining persistence with normal vision, when viewed on a television set, a flickering effect may be perceived. Flickering may be defined as an unintended rapid change in the instantaneous intensity of a video display. Flickering may occur whenever an instantaneous intensity of a video display decreases before the video display has been updated with new information required to maintain screen intensity. A refresh rate or rate at which a video display may be updated may be increased to maintain the screen intensity, thereby reducing flickering.

A display technique called interlacing was subsequently developed to address the flickering effect, enhance the effective frame rate and better utilize available bandwidth of a video signal. Interlacing divides a frame into one or more sequential fields, which may be selectively displayed. A parameter called an interlace ratio may be used to describe a manner or sequence in which video raster lines may be scanned to represent a video frame. For example, a 1:1 interlace ratio may signify a field consisting of adjacent vertical lines. Essentially, interlacing provides a technique, which may increase the frame rate without increasing the available bandwidth.

The national television standards committee of the USA (NTSC) has defined a standard which utilizes an interlace ratio of 2:1. The NTSC standard utilizes a technique in which two fields are scanned per frame. Using an interlace ratio of 2:1, a frame may be divided into an odd or upper field and an even or lower field. Accordingly, this may significantly reduce the effects of flickering by displaying each of the upper and lower field every one-sixtieth ($\frac{1}{60}^{th}$) of a second. In this regard, there refresh rate is increased from one-thirtieth ($\frac{1}{30}^{th}$) of a second to one-sixtieth ($\frac{1}{60}^{th}$) of a second and the bandwidth remains the same.

FIG. 1a is an exemplary diagram 100 illustrating an interlaced scanning technique. Referring to FIG. 1a, there is shown an upper field 102 and a lower field 104 of an interlaced video for a display having 10 lines. The interlaced video of FIG. 1 utilizes an interlace ratio of 2:1. In the upper field 102, the odd lines 1, 3, 5, 7, 9, 11, 13 and 15 are depicted. In the lower field 104, the even lines 2, 4, 6, 8, and 10 are illustrated. The current line being scanned is line 10 and the next line to be scanned is line 12. Lines 12, 14 and 16 have not yet been scanned. Lines 1–16 may be scanned from left (L) to right (R). The upper field 102 and the lower field 104, when combined, form the entire video frame. In order to minimize the effects of flickering, adjacent lines in the lower field 104 may need to be scanned at a rate that permits the lines in the lower field 104 to be updated before corresponding adjacent lines in the upper field 104 have begun to fade. For example, line 2 should be scanned before line 1 has begun to fade and line 4 should be scanned before line 3 has begun to fade.

FIG. 1b is an exemplary diagram 120 illustrating a non-interlaced scanning technique. Referring to FIG. 1b, there is shown a display frame 122 being scanned in a progressive or non-interlaced format. In non-interlaced scanning, all the lines for the entire display frame 122 are scanned in one pass. In this regard, the lines 1–13 of the display frame 122 may be successively scanned from left (L) to right (R). Line 13 of the display frame 122 is the current line being scanned. Lines 14, 15 and 16 have not yet been scanned.

As personal computers (PCs) and video monitors became popular, non-interlaced scanning began competing with interlace scanning. The competition was due to several factors such as the fact that luminescent materials used to make the display terminals was less prone to fading and video processing circuits and/or processors were capable of handling much higher refresh rates. The advent of standards and related technologies such as high-definition television (HDTV) and motion picture expert group (MPEG) video have also increased the popularity of progressive scanning. Additionally, the convergence of various communications technologies and the need to provide data on demand accessible by a single communication device have further led the various other scanning formats, along with a greater embedded base in interlaced and progressive scanning technologies. Accordingly, conversion techniques are required to convert between various scanning formats utilized by communication devices Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

Certain embodiments of the invention provide a method and system for conversion of an interlaced scanned video signal to a progressive scanned video. A method for converting interlaced formatted video to progressive scan video may include simultaneously performing 3:2 pull down detection, color edge detection and temporal filtering on a first field, a second field and a third field. Output results from the color edge detection and the temporal filtering may be bound to generate a bound output. The bound output and an output generated from the 3:2 pull down detection may be 3:2 cadence processed to achieve the interlace to progressive conversion. A selector may facilitate selecting between a filtered deinterlaced output and a reverse 3:2 pull down output.

In accordance with an aspect of the invention, the first field may be a current field. Accordingly, the third and second fields may be temporally filtered or infinite impulse response filtered. Color edge detection may be performed on the first and the second fields. Additionally, 3:2 pull down detection may be performed on the second and third fields. If the first field is a top field, then the second field is a corresponding prior bottom field with respect to the top field and the third field is a corresponding successive bottom field with respect to the top field. If the first field is a bottom field, then the second field is a corresponding prior top field with respect to the bottom field and the third field is a corresponding successive top field with respect to the bottom field.

In another embodiment of the invention may provide a machine-readable storage having stored thereon, a computer program having at least one code section for converting an interlaced scanned video signal to a progressive scanned video. The code section may be executable by a machine, thereby causing the machine to perform the steps as described above.

Another aspect of the invention may include a 3:2 pull down detector coupled to a 3:2 cadence processor and a color edge detector coupled to a binder. The binder may be coupled to a 3:2 cadence processor. A filter, which may be a temporal or infinite impulse response filter, may be coupled to the binder. A selector may also be coupled to the 3:2 cadence processor. A memory and a processor may also be coupled to any of the 3:2 pull down detector, the 3:2 cadence processor, the color edge detector, the binder, the filter and the output selector. The selector may select between a filtered deinterlaced output and a reverse 3:2 pull down output.

These and other advantages, aspects and novel features of the present invention, as well as details of an illustrated embodiment thereof, will be more fully understood from the following description and drawings.

BRIEF DESCRIPTION OF SEVERAL VIEWS OF THE DRAWINGS

FIG. 17a is a block diagram illustrating the organization of the fields utilized for the three-field (3-field) interlace to progressive conversion of FIG. 16 in accordance with an embodiment of the invention.

FIG. 17b is a block diagram illustrating another organization of the fields utilized for the three-field (3-field) interlace to progressive conversion of FIG. 16 in accordance with an embodiment of the invention.

DETAILED DESCRIPTION OF THE INVENTION

Figure 1A:
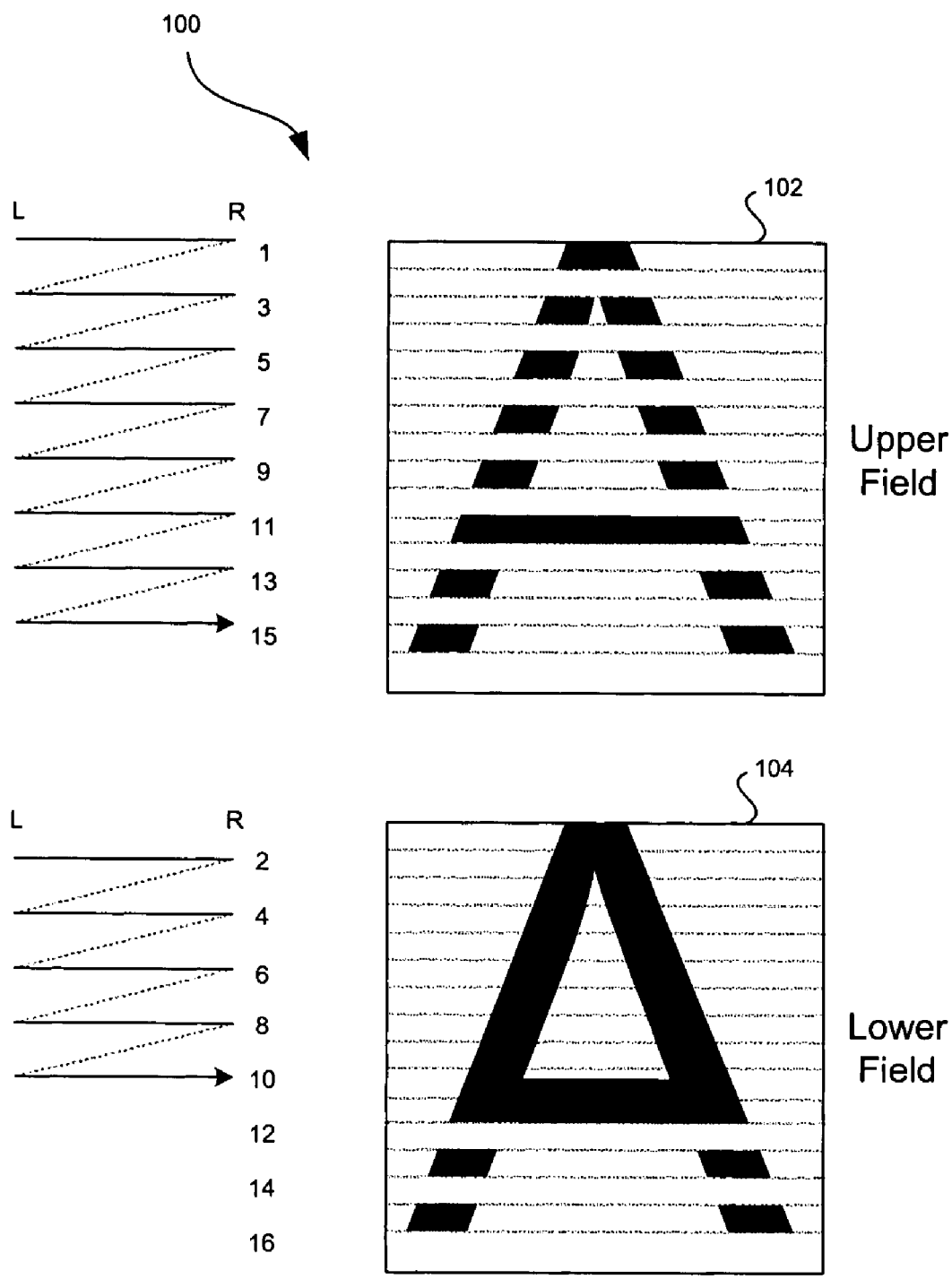
FIG. 1a is an exemplary diagram 100 illustrating an interlaced scanning technique.
Figure 1B:
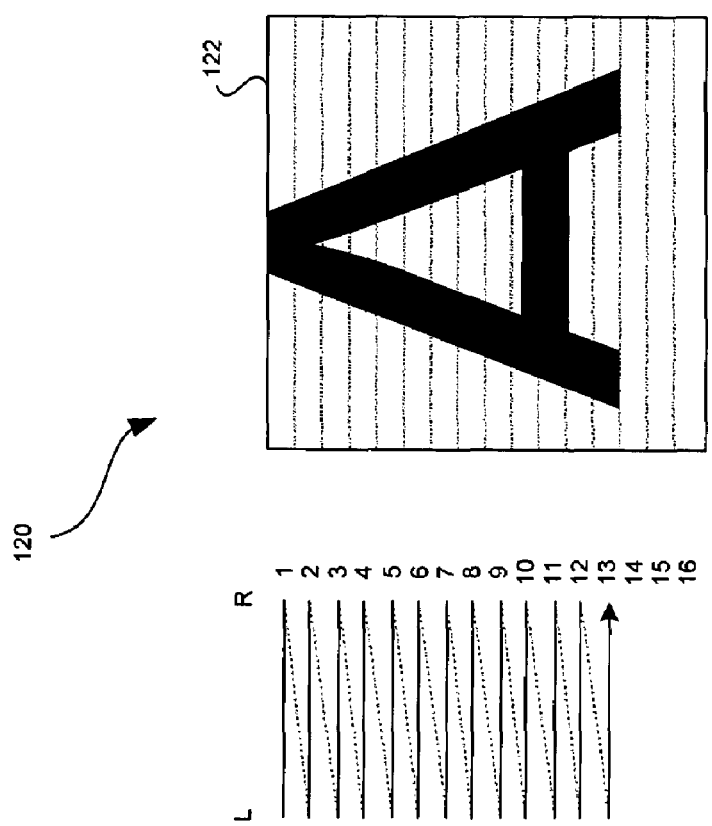
FIG. 1b is an exemplary diagram 120 illustrating a non-interlaced scanning technique.

Certain embodiments of the invention provide a method and system for conversion of an interlaced scanned video signal to a progressive scanned video. Converting interlaced video to progressive scan video may include simultaneously performing 3:2 pull down detection, color edge detection and temporal filtering on a first field, a second field and a third field. Output results that have been generated by the color edge detection and the temporal filtering may be bound to generate a bound output. An output generated from the 3:2 pull down detection and the bound output may be 3:2 cadence processed to achieve the interlace to progressive conversion. A selector may select between a filtered deinterlaced output and a reverse 3:2 pull down output.

A method for converting interlaced formatted video to progressive scan video may include simultaneously performing 3:2 pull down detection, color edge detection and temporal filtering on a first field, a second field and a third field. Outputs generated from the color edge detection and the temporal filtering may be bound to create a bound output. The bound output and an output generated from the 3:2 pull down detection may be 3:2 cadence processed to achieve the interlace to progressive conversion. A selector may facilitate selecting between a filtered deinterlaced output and a reverse 3:2 pull down output.

The first field may be a current field. Color edge detection may be performed on the first and the second fields. The third and second fields may be temporally filtered or infinite impulse response filtered. Additionally, 3:2 pull down detection may be performed on the second and third fields. In instances where the first field is a top field, then the second field may be a corresponding prior bottom field with respect to the top field and the third field may be a corresponding successive bottom field with respect to the top field. Similarly, in instances where the first field is a bottom field, then the second field is a corresponding prior top field with respect to the bottom field and the third field is a corresponding successive top field with respect to the bottom field.

Another aspect of the invention may include a 3:2 pull down detector coupled to a 3:2 cadence processor and a color edge detector coupled to a binder. The binder may be coupled to a 3:2 cadence processor. A filter, which may be a temporal or infinite impulse response filter, may be coupled to the binder. A selector may also be coupled to the 3:2 cadence processor. A memory and a processor may also be coupled to any of the 3:2 pull down detector, the 3:2 cadence processor, the color edge detector, the binder, the filter and the output selector. The selector may select between a filtered deinterlaced output and a reverse 3:2 pull down output.

Aspects of the invention provide a method and system for converting interlaced formatted video to progressive scanned video using a color edge detection scheme. Interlaced formatted video has long been utilized in traditional broadcast video. Interlacing may divide a video frame into two fields in which an upper field may contain even lines and a lower field may contain odd lines. The two fields may be separated in time by, for example, one half (½) of a frame period in order to reduce the transmission bandwidth. Consequently, instead of sending a frame every 1/60 sec, only one half (½) of the frame or either an upper or lower field of a frame may be sent. Interlacing may provide a more pleasant viewing experience since the human eye may be more adaptable to temporal filtering for higher spatial frequencies than it is for lower spatial frequencies.

Figure 2:
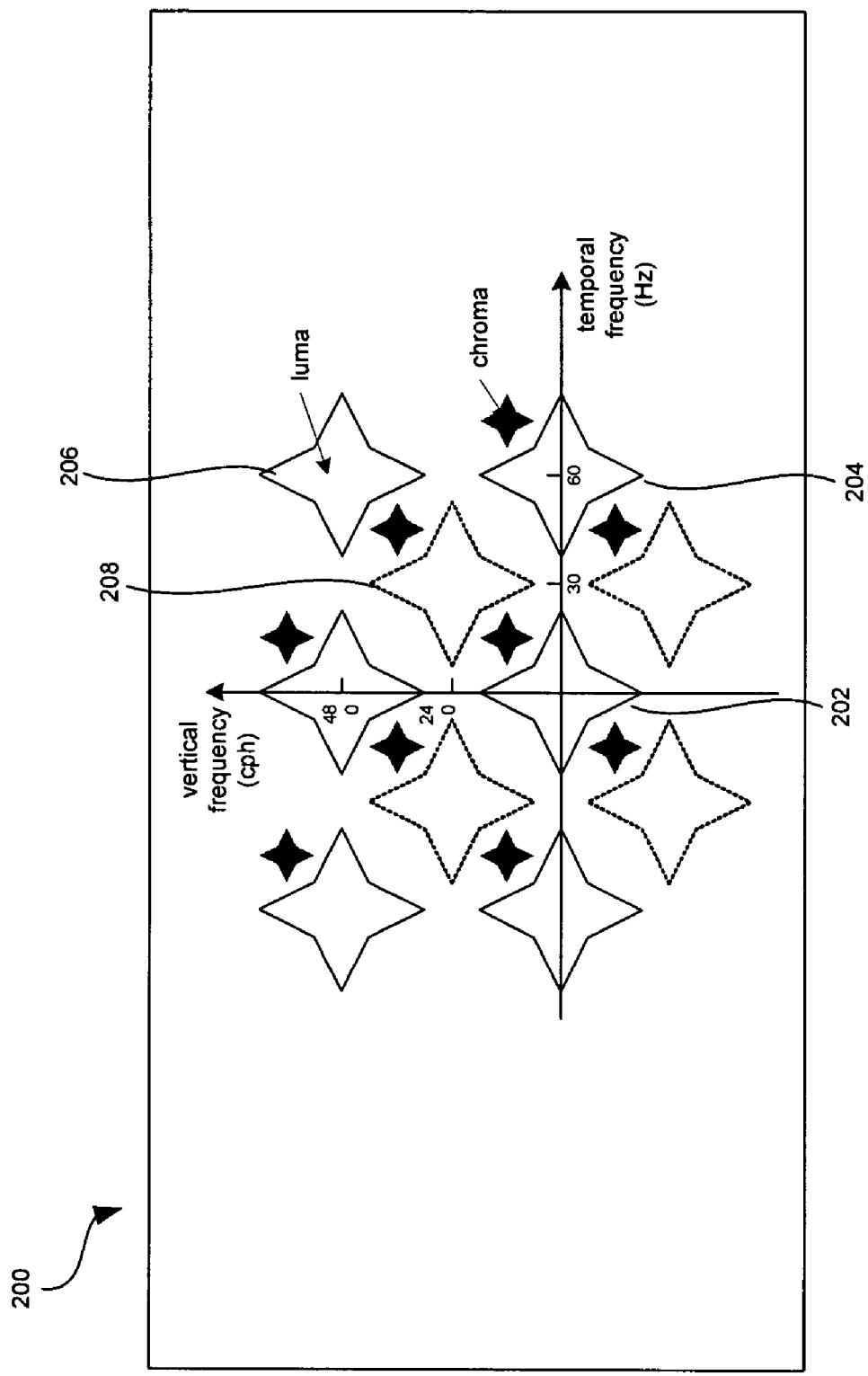
FIG. 2 is a graph of an exemplary vertical/temporal spectrum of an NTSC formatted video signal.

An interlaced formatted signal is quincunx sampled, similar in manner to the number five (5) on a dice, in the vertical and temporal directions. FIG. 2 is a graph of an exemplary vertical/temporal spectrum of an NTSC formatted video signal. Although a chrominance spectrum is included in the graph 200 for completeness, it may generally be separated by a video decoder prior to de-interlacing. In some instances of a component video, such as one decoded from a MPEG bitstream, the chrominance component may be separated from a luminance component which may generally have a wider spectrum. Referring to FIG. 2, a baseband signal 202 is depicted at coordinates 0 cycles per height, 0 hertz (0 cph, 0 Hz) along with a plurality of other luminance spectrum replicas. The luminance spectrum replicas are generally depicted in bold, for example luminance sample 204 located at coordinates (0 cph, 60 Hz) and luminance replica 206 located at coordinates (480 cph, 60 Hz). The luminance replicas of the field are depicted as dotted lines, for example, luminance replica 208 located at coordinates (240 cph, 30 Hz). Accordingly, in order to convert an interlaced video to a progressive scan video, any half-frame or field replicas of the spectrum may be removed in order to obtain a progressive sampled video. For example, the new sampling rate of a de-interlaced NTSC signal would be (480 cph, 60 Hz). In that case, in the first quadrant, the spectrum of the half-frame replica 208 centered at coordinates (240 cph, 30 Hz) may have to be removed.

In general, several types of interlace to progressive scan conversion (IPC) algorithms exist. Notwithstanding, most of these types of algorithms may be classified into three major categories, namely those involving linear techniques, non-linear techniques, and motion compensation techniques. One of the commonest and probably the simplest form of linear technique may be field interpolation. In field interpolation, pixel samples are filtered only in the vertical dimension. Accordingly, a height of one field of a frame may be stretched by some specified factor to produce a new frame. For example, an upper field of a frame may be stretched by a factor of two (2) so that the height of the new frame is twice its original height.

Another IPC technique may include two-dimensional vertical/temporal finite impulse response (FIR) filtering. In two-dimensional vertical/temporal finite impulse response (FIR) filtering, pixel samples may be taken in both the vertical and temporal dimensions. In the temporal dimension, pixel samples may be taken across multiple fields and then processed by an FIR filter. The non-selective filtering of an input video spectrum may be a significant drawback for some of these linear methods. In this regard, vertical details may generally be discarded along with important motion artifacts.

Non-linear techniques may include techniques such as motion adaptive filtering, non-linear filtering, pattern matching and feature extraction. A motion adaptive technique may typically be adapted to switch between different filtering modes dependent on for example, a threshold amount of detected motion. With reference to non-linear filtering, a popular benchmark is a 9-tap weighted median filter. Other methods include edge detection and feature extraction.

Motion compensation techniques is a fairly modern IPC technique. Motion compensation techniques gained popularity in mid 1990s, commensurate with the introduction of motion estimators used for MPEG-2 encoders. A key characteristic of motion compensation techniques involve interpolation in a direction of highest correlation by searching a reference field. Notwithstanding, although there might be a number of IPC solutions available, there are a few constraints that may severely limit design and implementation freedom. Nevertheless, they help to narrow down the selection of algorithm pretty quickly. Accordingly, the present invention provides a method and system that can overcome various drawbacks and limitations of prior art interlaced to progressive scan conversion (IPC).

Figure 3:
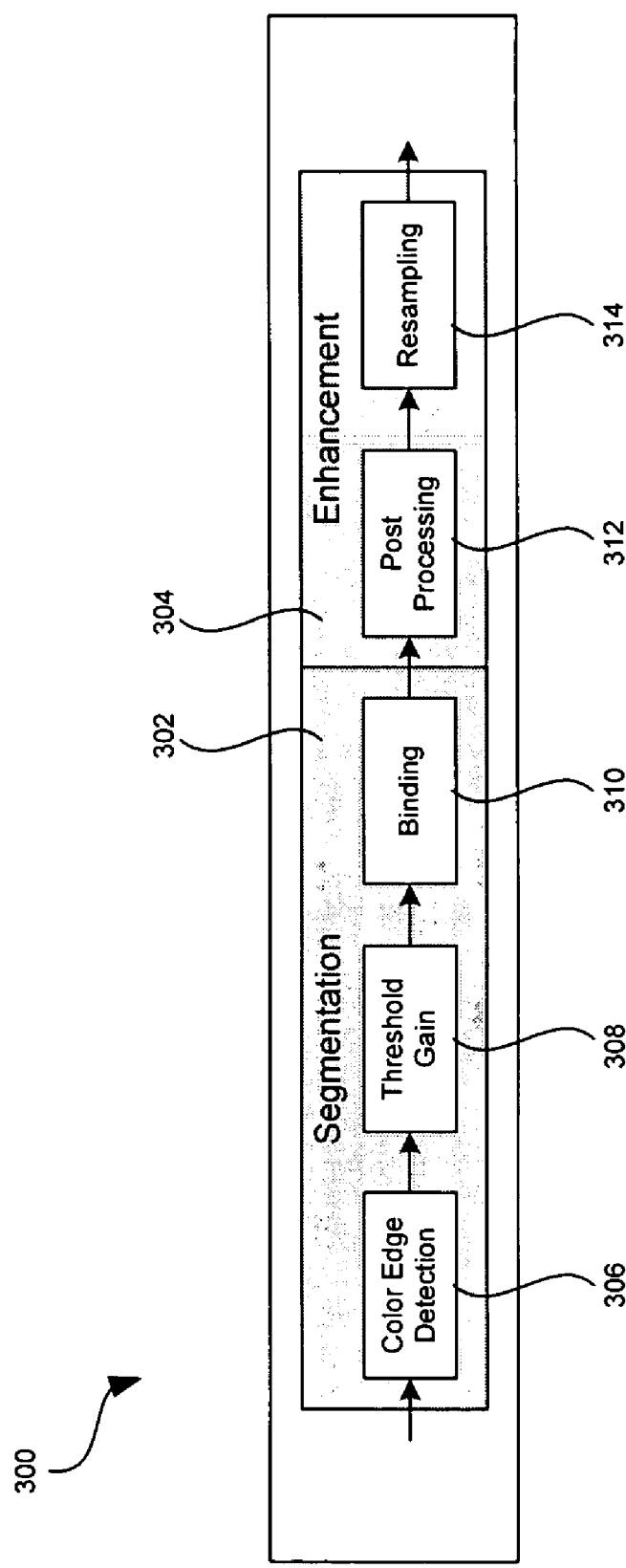
FIG. 3 is a block diagram of a system for converting an interlaced video to a progressive scan video using color edge detection in accordance with an embodiment of the invention.

In accordance with an embodiment of the invention, the system for converting an interlaced video to a progressive scan video may be premised on the principle that object motion may typically manifest itself as inter-field vertical high frequency. Accordingly, de-interlacing can be divided into two basic image-processing tasks, namely segmentation and enhancement. FIG. 3 is a block diagram of a system for converting an interlaced video to a progressive scan video using color edge detection in accordance with an embodiment of the invention. Referring to FIG. 3, there is shown a segmentation block 302 and an enhancement block 304. The segmentation block 302, may include a color edge detection block 306, a threshold gain block 308, and a binding block 310. The enhancement block 304 may include a post-processing block 312 and a resampling block 314.

The segmentation block 302 may be adapted to analyze both fields of a video frame and classifying any interlace artifacts contained therein. In this regard, the segmentation block 302 may be configured to process the each field of a frame and the pixels corresponding to each field.

The enhancement block 304 may be adapted to reduce the interlace artifacts in order to optimize fine picture detail. Interlace artifacts are defects that may be caused by interlacing. Interlace artifacts may include, but are not limited to, twitter, line crawl, vertical resolution loss and vertical and horizontal motion artifacts. In addition to creating artifacts, interlacing may also reduce any self-sharpening effect that may be attributed to visible scanning lines. This may make vertical image enhancement more difficult to perform.

The color edge detection block 306 may be adapted to apply color edge detection separately to each of the color components, namely Y (luminance), and chrominance Cr and Cb, all typically denoted as YCbCr. YCbCr may be used to represent the nonlinear video signals into which information has been transformed and which bears information pertaining to luminance and chrominance of an original signal. The luminance may be represented by one non-linear signal while the chrominance may be represented by two nonlinear signals, namely Cb and Cr. The Cr and Cb components typically represent color-difference signals in a digital format.

Figure 5:
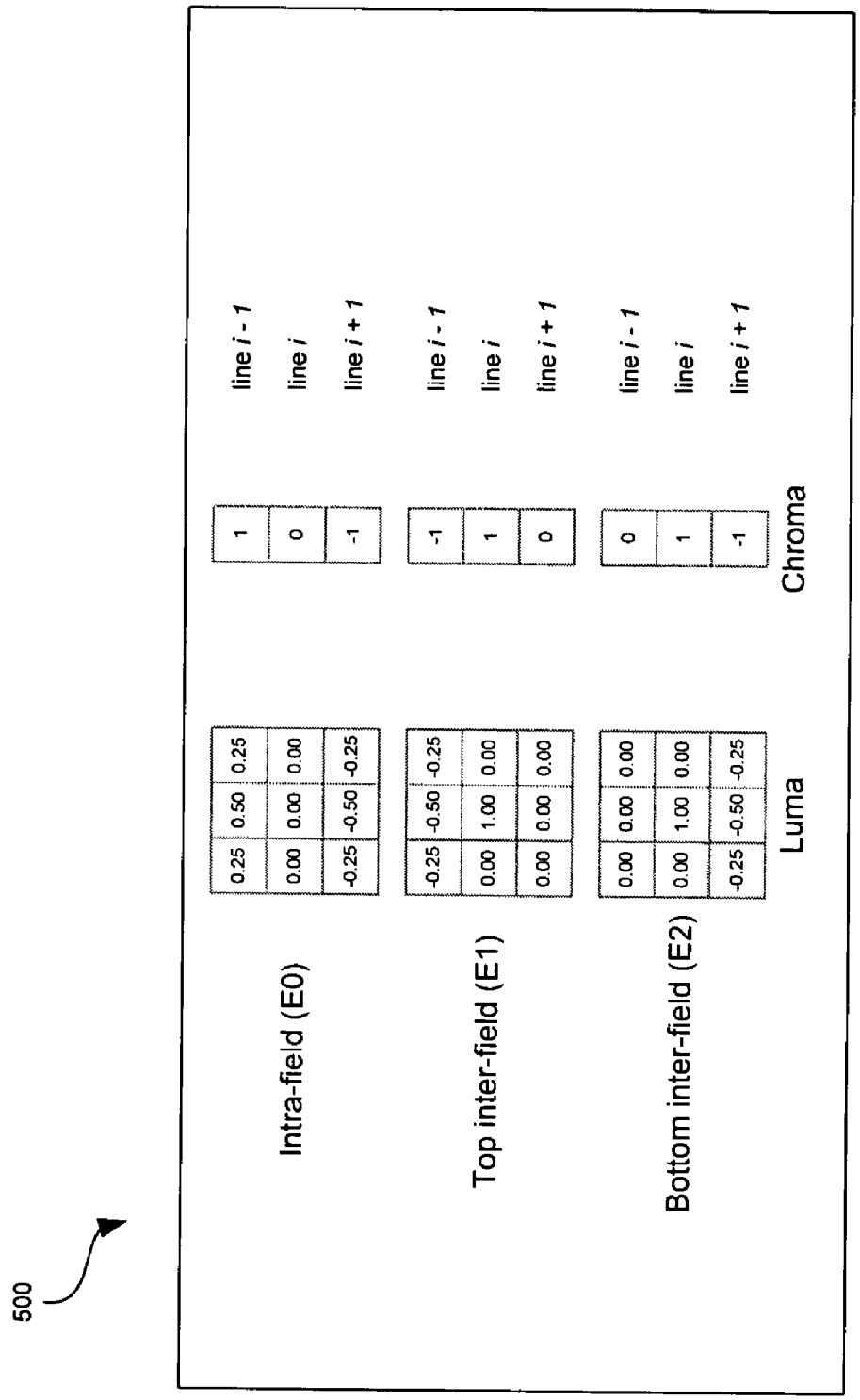
FIG. 5 represents a diagram 400 of an exemplary implementation of a color edge detector in accordance with an embodiment of the invention.

FIG. 5 represents a diagram 400 of an exemplary implementation of a color edge detector in accordance with an embodiment of the invention. Referring to FIG. 5, the color edge detector may be adapted to measure an amount of high frequency component in a frame on a pixel-by-pixel basis using two-dimensional high pass filters. In an alternative embodiment, the color edge detector may be adapted to measure the change in intensity within a frame on a pixel-by-pixel basis using two-dimensional high pass filters. In the exemplary implementation of FIG. 5, both intra-field and inter-field edge detections may be performed, although simple edge detection may be performed using video content bearing black and white. However, since better segmentation may be achieved using YCbCr video color space, exceptionally good results may be provided. Each component of YCbCr may be processed separately although it may be necessary to convert 4:2:2 formatted samples to 4:4:4 formatted samples before the YCbCr components are processed. Since luminance and chrominance have different frequency contents, separate filter kernels may be provided for the luminance and chrominance components. They are shown in the following diagram.

Referring to FIG. 5, a filter kernel, for example a 3×3 window filter may be adapted to measure changes in intensity of the pixels falling within the dimensions of the filter kernel. In this regard, the filter kernels may be applied to the frame created by interlacing a current field and its neighbor field together. Line i may represent a line in the neighbor field, while line i−1 and line i+1 may represent adjacent lines in the current field. The lines in the current field are not immediately processed. The filter kernel may be applied to an intra-field (E0), a top inter-field (E1) and a bottom inter-field (E2). For example, intra-field (E0) may be applied to a pixel array comprising a video. In operation, the pixel kernel may be overlaid on the pixel array on a per pixel basis to determine edge locations and each element in the filter kernel may then be multiplied by the pixel value that it overlays in the pixel array. In this regard, if the pixel array contains any sharp changes in intensity within a certain region covered by the window filter, the change in intensity may be detected by edge detector.

Advantageously, the luminance kernels are highly immune to noise and have the capability to retain diagonal details. For chrominance, a simpler pixel difference kernel may be sufficient. The luminance filter may be a product of a horizontal lowpass filter and a vertical high pass filter (HPF). On the other hand, chrominance is already horizontally low pass filtered since it is 4:2:2 sampled. An extra horizontal filter may be used to reduce a sensitivity the edge detector. After filtering, the absolute value of the result may be computed to determine an absolute magnitude of a signal. In this regard, the sign may not be pertinent to the practice of the invention although the invention is not so limited.

In accordance with an aspect if the invention, two fields may be used to create a de-interlaced frame. The two fields may be a current field and a neighboring field in the opposite polarity. The neighbor field may be either forward in time or backward in time. Although the ordering may be fixed to prevent de-interlace artifact of different temporal directions from being interleaved on the output, the invention may not be limited in this regard.

Figure 4:
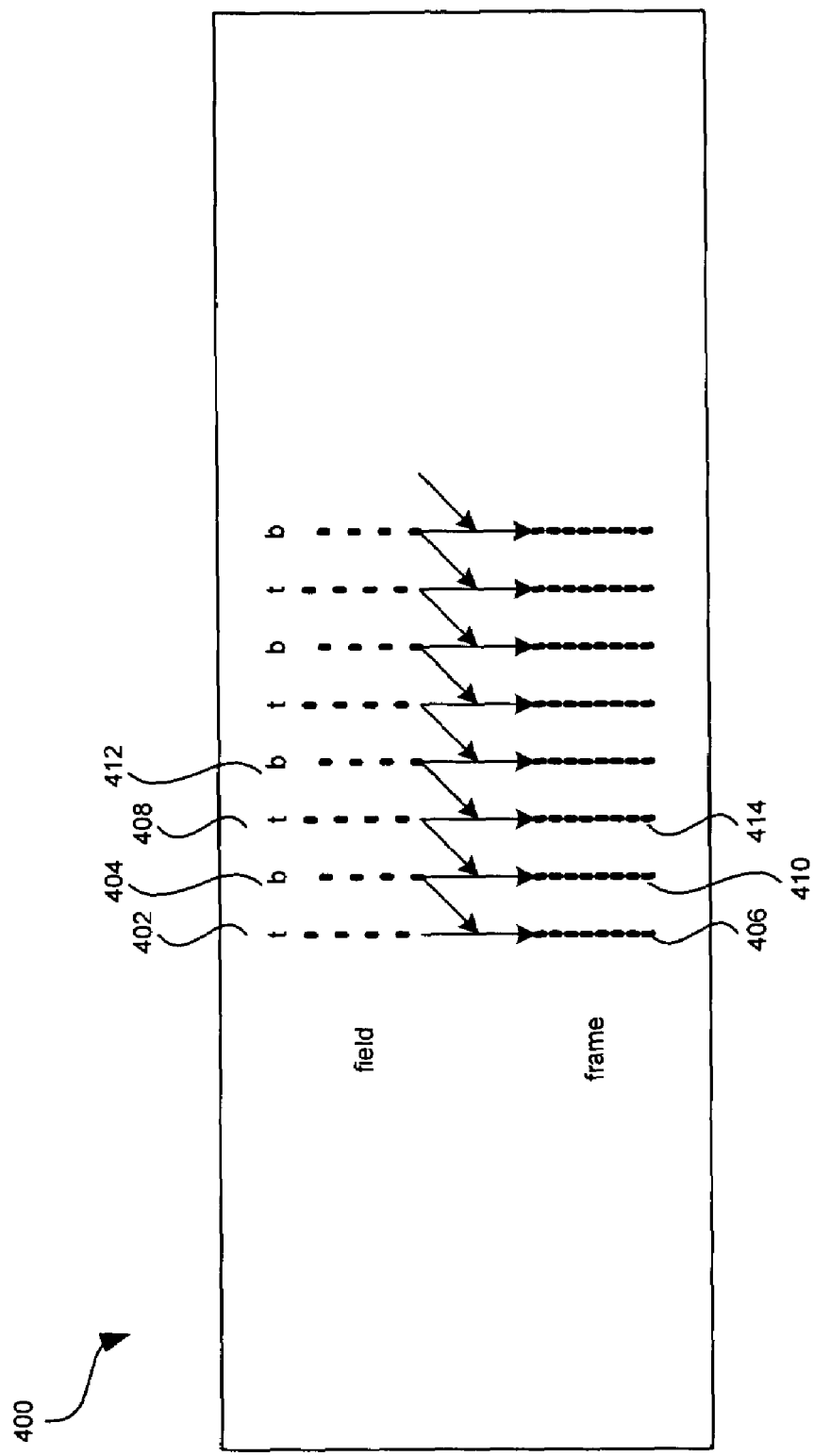
FIG. 4 is a diagram illustrating the creation of a deinterlaced frame in accordance with an embodiment of the invention.

FIG. 4 is a diagram illustrating the creation of a de-interlaced frame in accordance with an embodiment of the invention. Referring to FIG. 4, an upper or top field (t) and a lower or bottom field (b) along with a corresponding frame is illustrated. Referring to FIG. 4, there is shown a top field (t) 402 and a bottom field (b) 404 being used to create a de-interlaced frame 406. The bottom field (b) 404 may be a neighboring field of top field (t) 402 in the opposite polarity. Similarly, bottom field (b) 404 and a top field (t) 408 may be used to create a de-interlaced frame 410. The top field (t) 408 may be a neighboring field of bottom field (b) 408 field in the opposite polarity. Also, top field (t) 408 and a bottom field (b) 412 may be used to create a de-interlaced frame 414. The bottom field (b) 412 may be a neighboring field of top field (t) 408 in the opposite polarity.

In the threshold gain block 308, the result of the edge detectors may used for quantifying the likelihood of motion. The threshold gain block 308 may be adapted to independently compute the likelihood of motion for each color component. The maximum of the inter-field edges may be compared against the intra-field edge. For example, the intra-field may be characterized as being relatively smooth, whereas the maximum of the two inter-field edges may be characterized as bearing large intensity change. Accordingly, this may lead to a high probability that a motion artifact called a serration is present.

The table below illustrates the likelihood of a serration by examining interference between the inter-field edges.

|  |  | Inter-Field Edge (MAX (E1, E2)) | |
| --- | --- | --- | --- |
|  |  | Weak | Strong |
| Intra-Field | Weak | Unlikely | Most Likely |
| Edge (E0) | Strong | Most Unlikely | Likely |

Notwithstanding, the above table may be an over-simplification of the threshold and gain processing since the perception of motion may be non-linear and difficult to model by a few equations. Instead, it might be more appropriate to utilize a lookup table.

Figure 6:
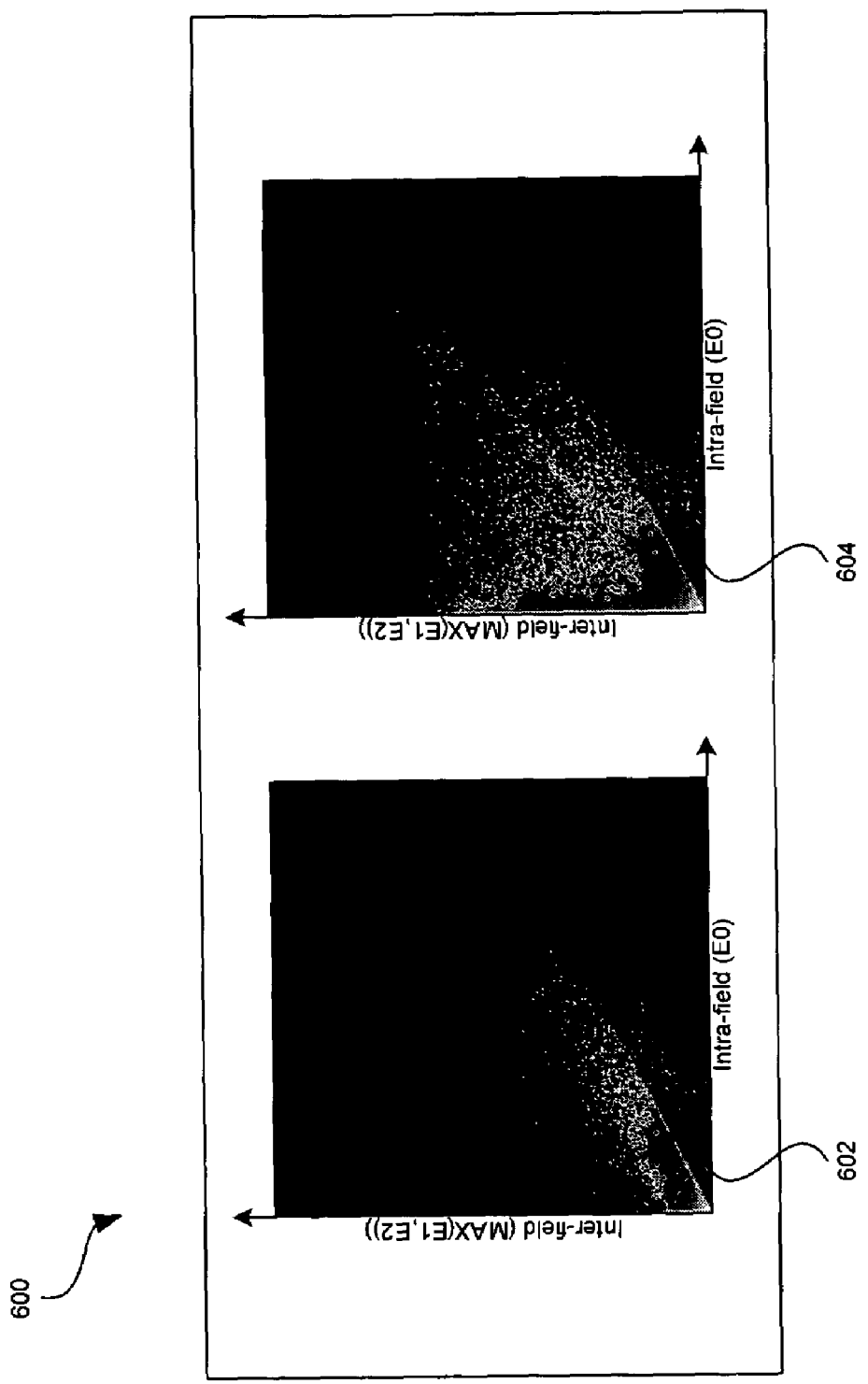
FIG. 6 is a diagram 600 containing two histogram plots 602, 604 of an exemplary luminance edge detection in accordance with an embodiment of the invention.

FIG. 6 is a diagram 600 containing two histogram plots 602, 604 of an exemplary luminance edge detection in accordance with an embodiment of the invention. Referring to FIG. 6, the horizontal axis may represent E0, and the vertical axis may represent maximum values MAX(E1, E2) for red, where E1 may represent green, and E2 may represent blue. In FIG. 6, pixels processed as IPC may logged and represented. The two exemplary plots 602, 604 may represent the same portion of video clip, for example. Histogram plot 602 may represent a relatively still video while histogram plot 604 may represent a large object moving in the foreground.

The goal of setting a threshold may involve the screening out of those pixels which may contain motion artifacts while retaining detailed information for the video. Empirical result may show a threshold line slightly offset from the diagonal of the plots which may provide great accuracy. A gain which may be used to determine the amount of motion may be represented by a line further offset from the diagonal. Since luminance and chrominance may have different characteristics, separate tables may be utilized. Since E0, E1, and E2 are generally denoted using 8-bit data, an exemplary implementation would require 256 16-bit entries for each table and the threshold and gain may both be represented by 8-bits of data. In one aspect of the invention, the table may be made smaller by utilizing an exponential scale for parameter E0. This scale may be appropriate since the pixels are sparser as E0 increases.

In accordance with one aspect of the invention, the E0 axis may be divided into 20 grids. Each of the first four grids may be two units wide and every four grids may be two times wider than the previous four grids. The last grid may be 40 units wide instead of 32 units wide in order to cover values ranging from 0 to 255. In such as case, E0 may be further subdivided as 0, 2, 4 6, 8, 12, 16, 20, 24, 32, 40, 48, 56, 72, 88, 104, 120, 152, 184, 216. The threshold offset may be represented by a signed 8-bit integer, which may be added to E0 to formulate the actual threshold. Accordingly, an optimal setup may be flat in the middle portion of E0 and dips at both ends. The gain may be represented as an unsigned 8-bit integer, which may control the sensitivity of a motion detector. A typical setup may involve providing a peak at DC and gradually decrease as E0 increases. In this regard, the threshold offset has a maximum near E0=0 (DC), and it may decrease as E0 increases.

A motion value t may be computed for each color component as (C=Y, Cb, or Cr):

Motion[C]=Gain(E0[C])*MAX(E1[C],E2[C])−E0[C]−Threshold_Offset(E0[C]))

Motion[C]=CLAMP(Motion[C],0,255)

Figure 7:
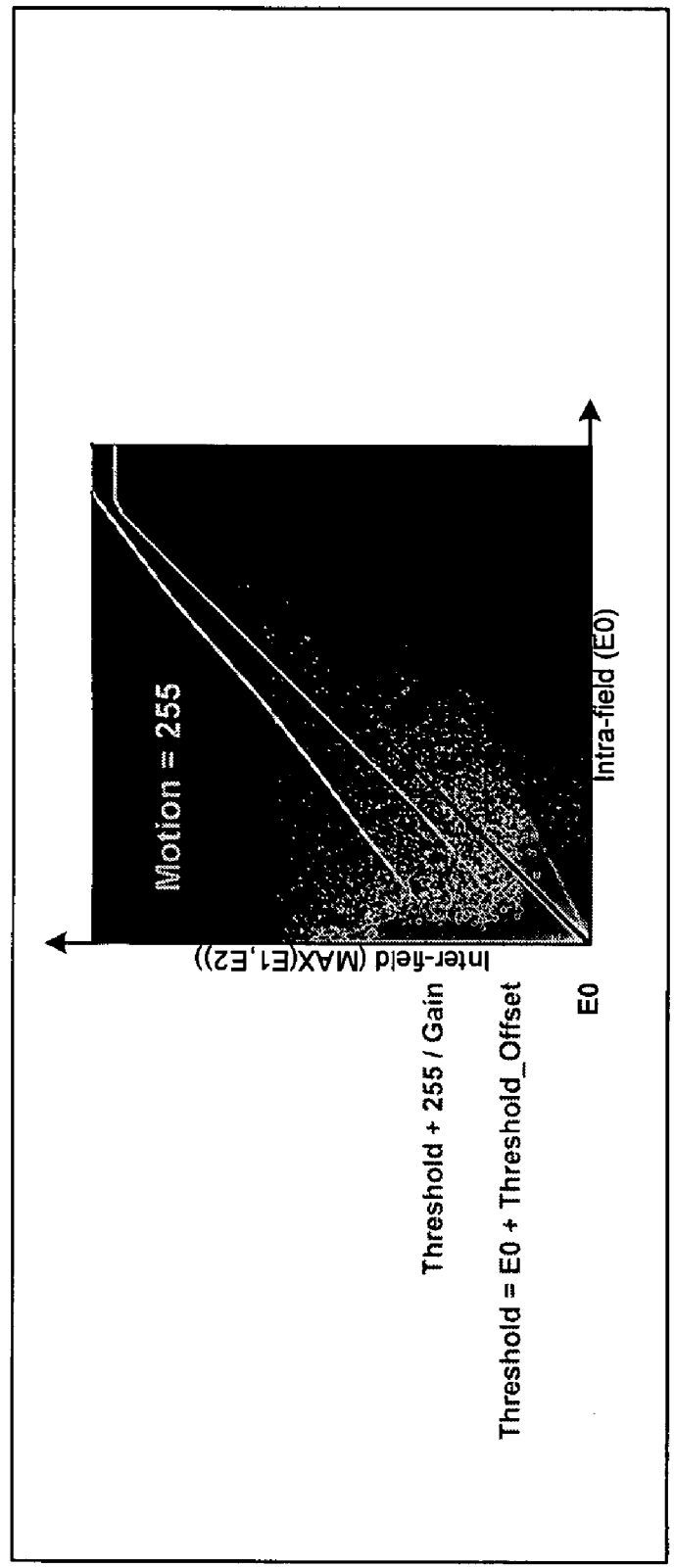
FIG. 7 is a diagram 700 illustrating an exemplary graph of the overlay and the threshold and gain on histogram plot 604 of FIG. 6 in accordance with an embodiment of the invention.

FIG. 7 is a diagram 700 illustrating an exemplary graph of the overlay and the threshold and gain on histogram plot 604 of FIG. 6 in accordance with an embodiment of the invention. Referring to FIG. 7, diagram 700 characterizes the differences in FIGS. 602 and 604 of FIG. 6, which both describe the same video content. However, the difference between 602 and 604 may be due to motion. Particularly, 604 depicts a significant portion of the picture in motion which may be especially discernible in the low E0 and high MAX(E1,E2) corner of 604, and which is segmented by the threshold line.

The color edge detection block 306 and the threshold and gain block 308 may be configured to be applied separately on each color component. Accordingly, the results from the color edge detection block 306 and the threshold and gain block 308 may have to be bound together or combined to create a single value. The binding block 310 may be adapted to bind each YCbCr component for each pixel to create, for example a single value for each pixel. In one aspect of the invention, any one or more technique such as a Euclidean distance, addition, multiplication, or maximum may be utilized by the binding block 310. Since each of these techniques may have certain advantages and disadvantages, an optimal solution may be chosen to optimize accuracy. For example, the Euclidean technique lacks bias, but its square root technique may expensive to compute. Similarly, addition and multiplication may be cheaper and simpler to compute, but they may have a tendency to mask polarized results such as a large E1 and a small E2. The maximum function may be a better alternative since it may be easier to compute and it does not mask polarized result. Additionally, use of too many pixels may also result in the false classification of motion. Notwithstanding, in accordance with an aspect of the invention, a bound motion value which may generated by the binder 310 may be defined as:

Motion=MAX(Motion[Y], Motion[Cb], Motion[Cr]).

The post-processing block 312 may be configured to be an optional block that may be enabled whenever additional processing may be required. For example, in video applications, noise present in the video input may result in incorrect motion detection. Accordingly, the post-processing block 312 may be adapted to filter out any unwanted signal components such as noise.

The resampling processing block 314 may be adapted to determine the actual value for each pixel in the de-interlaced picture. In this regard, the resampling processing block 314 may be adapted to perform vertical and/or horizontal filtering to determine the actual pixel values. A de-interlaced pixel may be expected to be temporally located somewhere between a current field and a neighbor field. Accordingly, the de-interlaced picture value may be determined by interpolation. However, cost constraints might limit interpolation to a bilinear interpolation of three pixels. In bi-linear interpolation, two vertically adjacent pixels and one temporally neighboring pixel may be utilized for interpolation. The temporal bi-linear interpolation may be determined based on an amount of motion detected for the pixel. In a case where no motion is detected, a motion value may be assigned a value of zero (0), motion=0. In this regard, it may be appropriate to use the value of a pixel in the neighbor field. However, in a case where there is motion, a motion value may be assigned a value of one (1), motion=1. In this regard, the average of the pixel values in the current field may be utilized. In accordance with one aspect of the invention, a reconstruction filter may be adapted to utilize this bi-linear interpolation. It should be recognized by those skilled in the art the invention is not limited to bi-linear interpolation and other schemes may be utilized without departing from the spirit of the invention.

Figure 8:
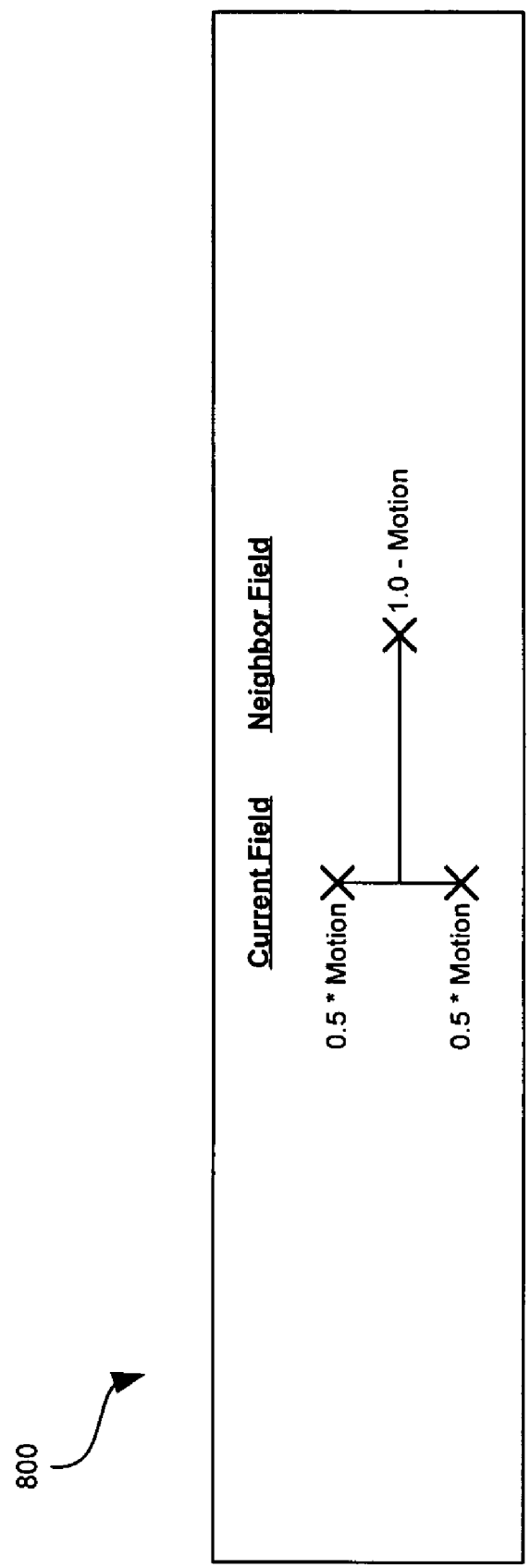
FIG. 8 is diagram 800 of an exemplary reconstruction filter that may be adapted as at least a part of optional post-processing block 312 in accordance with an embodiment of the invention.

FIG. 8 is diagram 800 of an exemplary reconstruction filter that may be adapted as at least a part of optional post-processing block 312 in accordance with an embodiment of the invention. Referring to FIG. 8, the reconstruction filter may be implemented as a three-tap horizontal median filter that may be adapted for use by the post-processing block 312. The reconstruction filter may be adapted to utilize temporal bi-linear interpolation to determine an amount of motion detected in vertical pixels of a current field and a pixel in a temporally adjacent neighbor field. The three-tap horizontal median filter may be applied to previously bound motion values in order to optimally suppress, for example, sporadic noise without adversely impacting video quality such as causing a blurred video.

Although statistics gathering may not be essential to the practice of the invention, it may be optionally provided to enhance the interlaced to progressive scan conversion (IPC) method and system. Statistics gathering may be done at a system level and may provide useful information that may be used to tune IPC processing. For example, a frame motion count parameter may be defined to track a number of non-zero motion pixels occurring per frame. This parameter may be logged or evaluated in real-time. The frame motion count parameter may be used, for example, in a control loop to adaptively adjust the gain of the motion detector. In one aspect of the invention, the gain of the motion detector may be increased after a series of low motion frames have been processed and detected. In this case, the reconstruction filter may be adapted to provide less interpolation. Additionally, the gain of the motion detector may be decreased after a series of high motion frames have been processed and detected. In this case, the reconstruction filter may be adapted to provide more interpolation.

Figure 9:
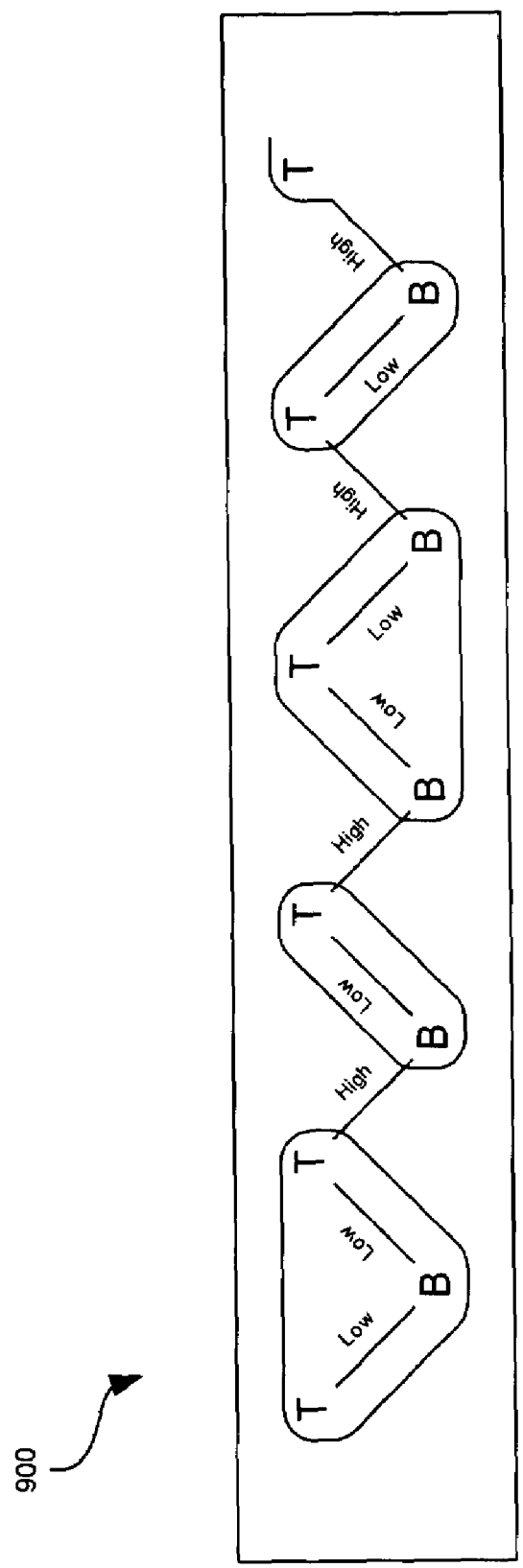
FIG. 9 is a block diagram 900 of a 3:2 pull down algorithm in accordance with an embodiment of the invention.

In addition, this frame motion count parameter may be used to detect a 3:2 pull-down cadence. A cadence may be found in video that has been converted from a first frame rate to a second frame rate. The frame motion count of two fields originating from the same frame may be smaller than that the frame motion count parameter for two fields originating from two different frames. FIG. 9 is a block diagram 900 of a 3:2 pull down algorithm in accordance with an embodiment of the invention. Referring to FIG. 9, there is shown odd or top field (T) and even or bottom fields (B) for various interlaced frames. 3:2 pull-down may be used to convert video formatted in 24 fps to video formatted in 30 fps format. In order to achieve 3:2 conversion, every other video frame may be held for three (3) fields, thereby resulting in a repetitive sequence of three (3) fields and two (2) fields. FIG. 9 illustrates how the fields are scanned in order to achieve 3:2 pull-down.

In accordance with an embodiment of the invention, the IPC may be implemented as part of a video processing integrated circuit (IC) or chip. In one aspect of the invention, the IPC may be implemented as part of a vertical scaler of an MPEG decoder, although the invention is not limited in this regard. The IPC may also be adapted to interface with, for example an MPEG feeder and a video playback engine.

Figure 10:
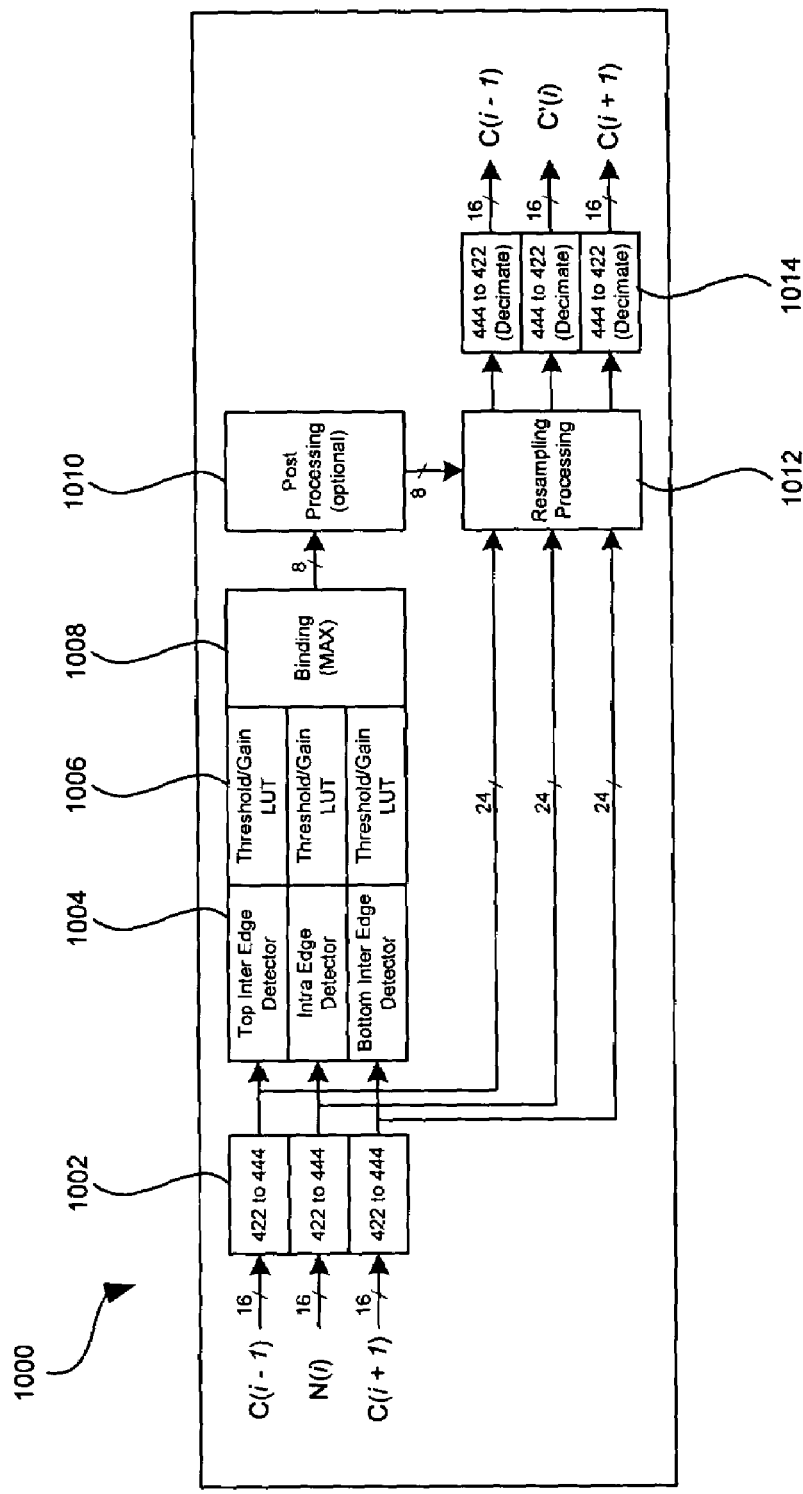
FIG. 10 is a high-level block diagram 1000 of and exemplary IPC block in accordance with an embodiment of the invention.

When integrated within a vertical scaler, an IPC block may be inserted as a logic slab between a line buffer and the filter data path. Associated circuitry and/or logic of the line buffer, including but not limited to write logic may have to be modified. FIG. 10 is a high-level block diagram 1000 of and exemplary IPC block in accordance with an embodiment of the invention. Referring to FIG. 10, there is shown a plurality of input line buffers 1002, a plurality of edge detectors 1004, a plurality of threshold and gain processing blocks 1006, a binding processing block 1008, a post-processing block 1010, a resampling processing block 1012, and a plurality of output line buffers 1014.

The plurality of input and output line buffers 1002, 1014 may be any suitable random access memory (RAM) such as, static RAM (SRAM), dynamic RAM (DRAM) or video RAM (VRAM). Each of the plurality of the edge detectors 1004 and the threshold and gain processing blocks 1006, the binding processing block 1008, the post processing block 1010 and the resampling block 1012 may be adapted to function as described herein. The output of the IPC block containing the de-interlaced frames may subsequently be scaled. Since IPC may utilize standard definition (SD) up-scaling, a 4-tap filter may be used inside the vertical scaler.

Figure 11A:
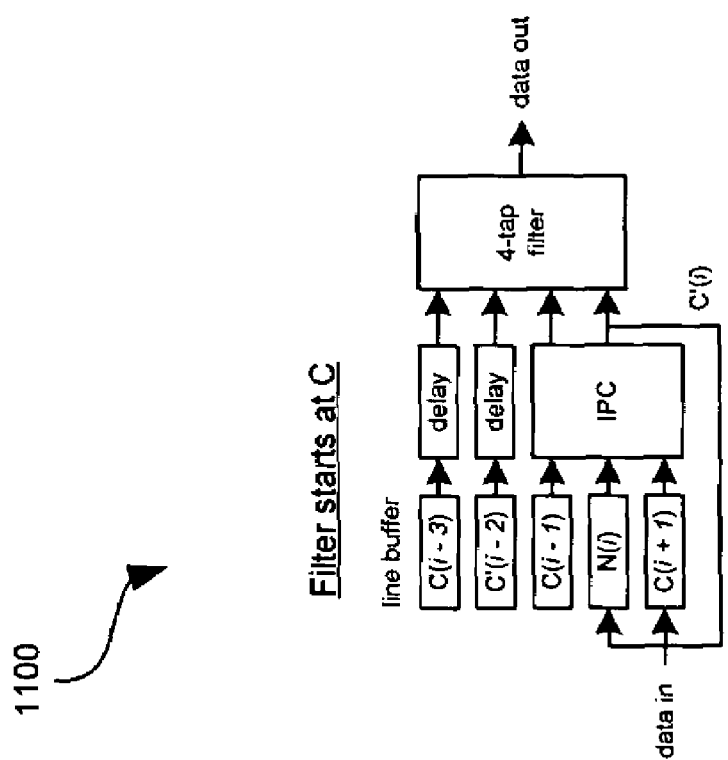
FIG. 11a is a block diagram 1100 illustrating standard definition up-scaling in accordance with an embodiment of the invention.

FIG. 11a is a block diagram 1100 illustrating standard definition up-scaling in accordance with an embodiment of the invention. Referring to FIG. 1a, the top line of the filter may be adapted to start in the current field. Accordingly, the interpolated result of the neighbor field may be adapted to start in the current field.

Figure 11B:
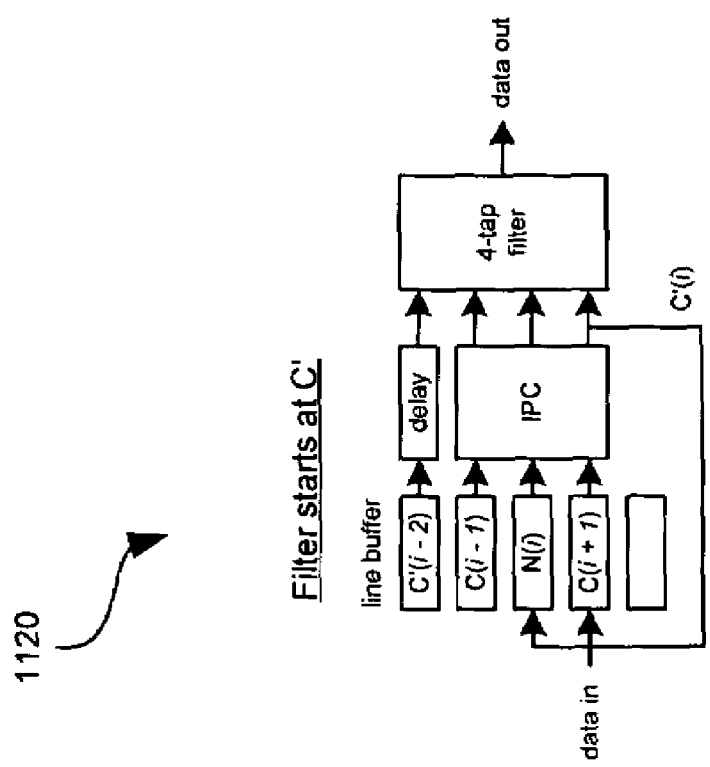
FIG. 11b is a block diagram 1120 illustrating standard definition up-scaling in accordance with an embodiment of the invention.

FIG. 11b is a block diagram 1120 illustrating standard definition up-scaling in accordance with an embodiment of the invention. Referring to FIG. 11b, the top line of the filter may be adapted to start in the neighbor field. Accordingly, the interpolated result of the neighbor field may be adapted to start in the neighbor field.

In a worst case scenario, five (5) SD lines may be required. Accordingly, if four (4) SD lines are currently supported, an extra line with the same amount of buffer may be required to provide support for five (5) SD lines. Since the horizontal SD resolution is 720 pixels, using two (2) 1920-pixel lines may provide more space than is required for five (5) SD 720-pixel lines. In this regard, the line buffer may be rearranged as a multi-bank, multi-port memory in which pixels belong to the same line may be distributed among different memory banks. Each bank of memory may be adapted have its own addressing logic. The two (2) 1920-pixel lines may be arranged as four 480-word×32-bit RAMs.

Figure 12:
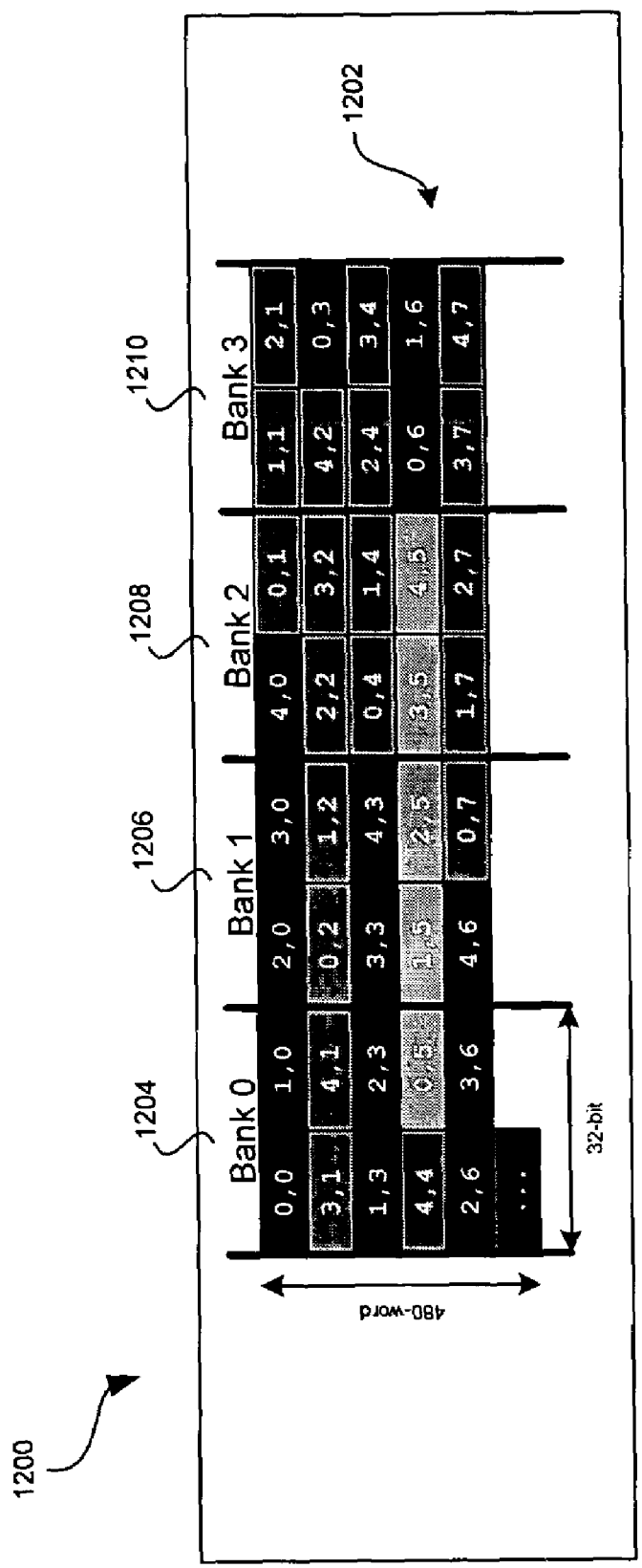
FIG. 12 is a block diagram 1200 of an exemplary line buffer arrangement in accordance with an embodiment of the invention.

FIG. 12 is a block diagram 1200 of an exemplary line buffer arrangement in accordance with an embodiment of the invention. Referring to FIG. 12, there is shown a memory 1202 having a first bank 0 1204, a second bank 1 1206, a third bank 2 1208 and a fourth bank 3 1210. The indices inside each memory location refer to a line number and pixel number respectively. The memory 1202 may be arranged as four (4) 480-word×32-bit RAMS. For example, bank 0 1204 may be arranges a 480-word bank of memory which is 32-bits wide. The line numbers may be adapted to start at 0 and end at 719.

Figure 13:
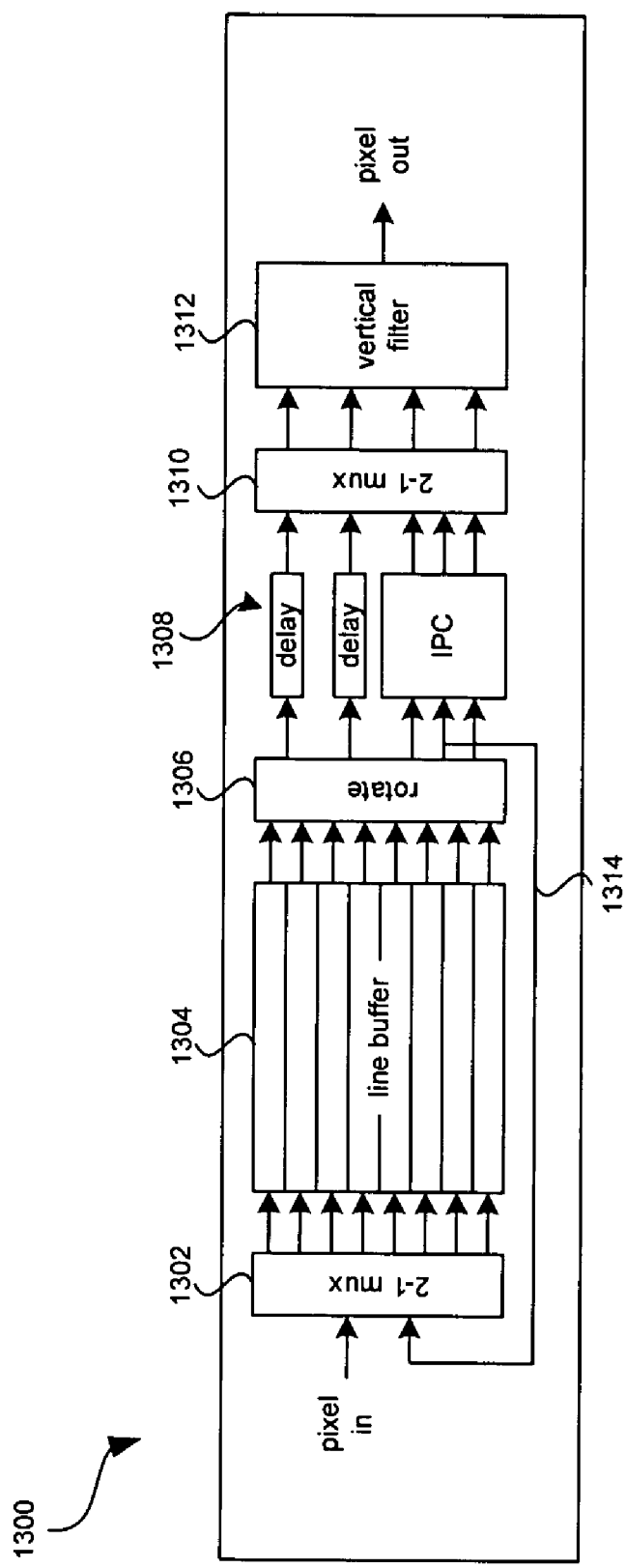
FIG. 13 is a block diagram 1300 of a modified scaler in accordance with an embodiment of the invention.

In accordance with the inventive arrangements, a vertical scaler may require certain modifications to inter-operate with the IPC block. FIG. 13 is a block diagram 1300 of a modified scaler in accordance with an embodiment of the invention. Referring to FIG. 13, there is shown an input multiplexer block 1302, a line buffer block 1304, a unidirectional rotate network block 1306, a delay network block 1308, an output multiplexer block 1310, a vertical filter block 1312 and an IPC block 1314.

The input multiplexer block 1302 may be coupled to the line buffer 1304. In operation, the input multiplexer block 1302 may be adapted to receive an input pixel array signal and produce and output signal which may load individual pixels for a line from the receive pixel array signal into the line buffer 1304.

The unidirectional rotate network block 1306 may be coupled to one or more outputs of the line buffer block 1304. The output of the unidirectional rotate network block 1306 may be coupled to both the IPC block 1314 and the delay network block 1308. The unidirectional rotate network block 1306 may be adapted to the read ports of the line buffer to reorder data before it may be used by the IPC block 1314 and the scaler. For example, each memory bank may have to be independently addressed. This may be necessary to facilitate multi-pixel read which may wrap around from bank 3 to bank 0.

Delay network block 1308 may be adapted to compensate for processing delays that may be attributed to the IPC block 1314. In one embodiment of the invention, example, two (2) pixel delay elements may be added to the output of the line buffer to compensate for any the delay through the IPC block.

Output multiplexer block 1310 may be coupled to an output of the delay element block 1308 and one or more outputs of the IPC block 1314. The output multiplexer block 1310 may utilize one or more 2-to-1 multiplexers. One or more outputs of the multiplexer block 1310 may be coupled to one or more inputs of the vertical filter block 1312. In accordance the invention, the output multiplexers may be adapted to handle the scaling described in FIG. 11a and FIG. 11b.

An output signal 1316 from the unidirectional rotate network block 1306 may be coupled as an input to the input multiplexer block 1302. The output signal 1316 may be configured as an additional write port to the line buffer 1304. The output signal 1316 may be adapted to store the line which has just been de-interlaced by the IPC block 1314 into the line buffer. In this regard, the line just de-interlaced may be used for subsequent scaling.

Figure 14:
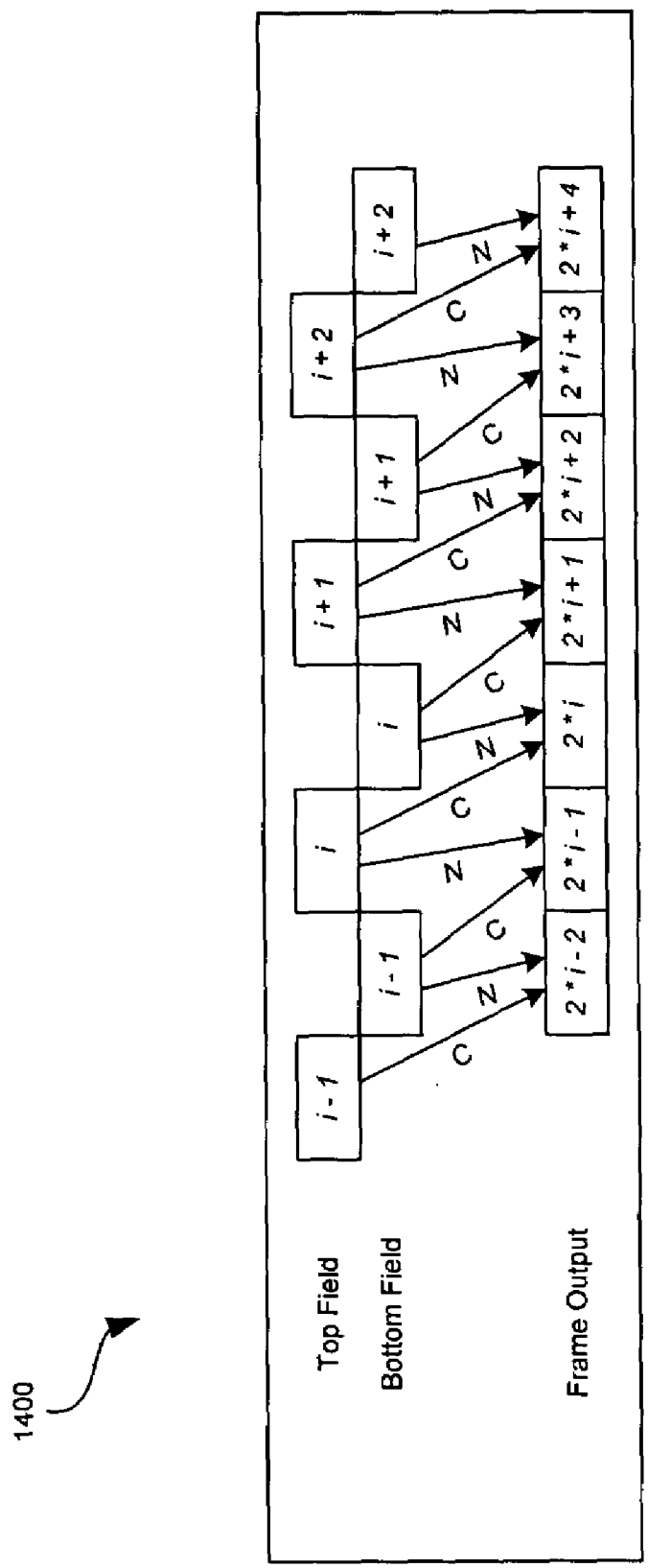
FIG. 14 is a block diagram illustrating an exemplary field interlace in accordance with an embodiment of the invention.

An MPEG Feeder may be configured to fetch and interlace two fields together as required by the IPC block. In this regard, the two fields may be the current and the neighbor field since they may progress in time as a sliding window of two consecutive fields in opposite polarities. FIG. 14 is a block diagram 1400 illustrating an exemplary field interlace in accordance with an embodiment of the invention. Referring to FIG. 14, the current field may be denoted by C and N may denote the neighbor field. There is shown four (4) top fields i−1, i, i+1, and i+2. The corresponding bottom fields are labeled i−1, i, i+1, and i+2 but are ordered differently in time. Accordingly, the frame output may be ordered as shown.

Figure 15:
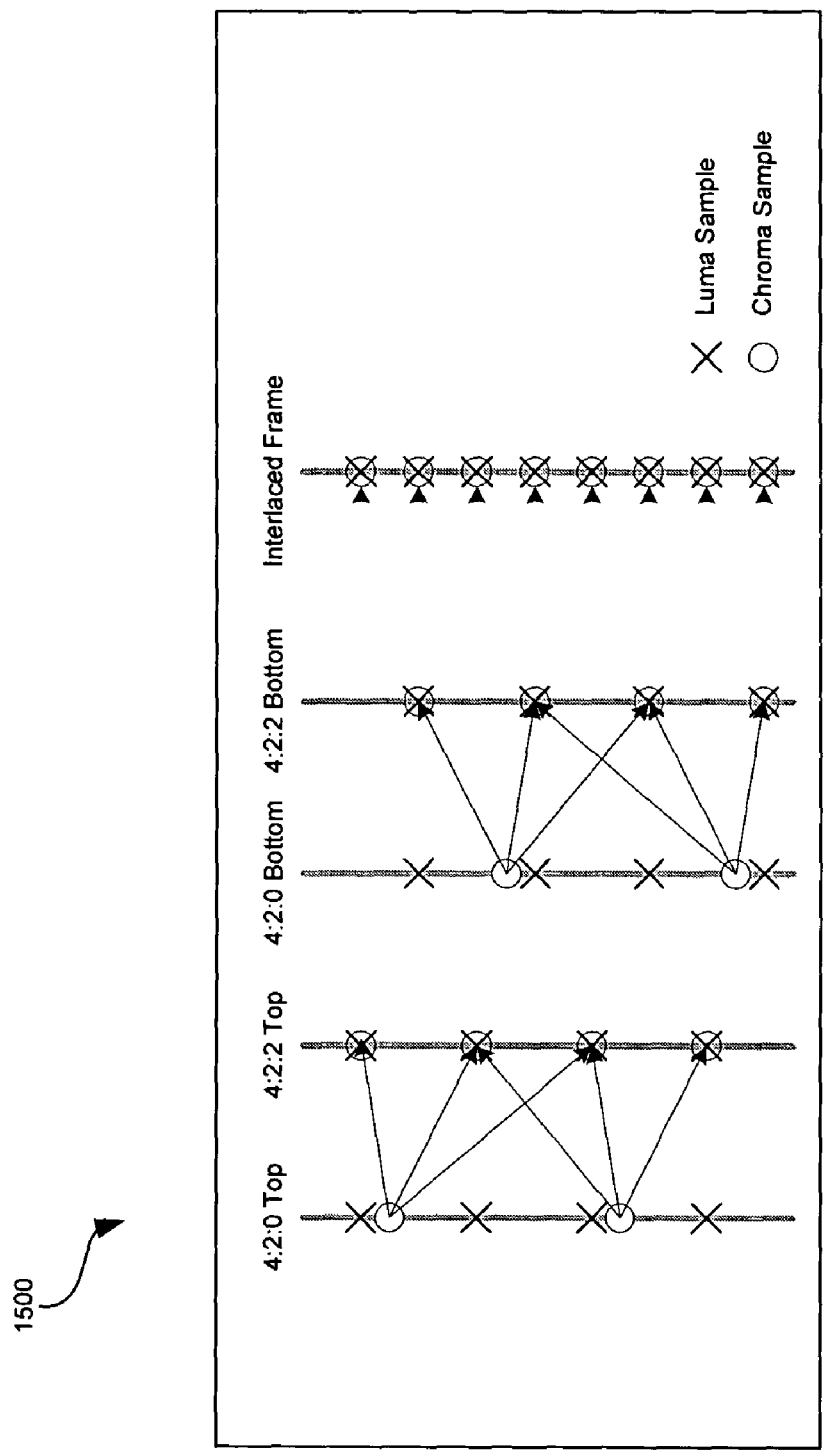
FIG. 15 is a block diagram of a chrominance interpolation in accordance with an embodiment of the invention.

In another embodiment of the invention, an MPEG feeder may be adapted to conform with the operations of the IPC block. For example, the MPEG feeder may be adapted to handle chrominance 4:2:0 to 4:2:2 conversion. 4:2:0 is a sampling system that may be utilized for digitizing the luminance and color difference components, namely Y, R-Y, B-Y, of a video signal. The color difference components may represent the 13.5 MHz sampling frequency of Y, while the R-Y and B-Y may be effective sampled at a frequency of 6.75 MHz between every other line. Accordingly, in order to properly interlace two fields correctly, the chrominance for each field may be independently interpolated. FIG. 15 is a block diagram 1500 of a chrominance interpolation in accordance with an embodiment of the invention. 4:2:2 may represent the digital component signal generated from sampling the luminance at a frequency of 13.5 MHz and sampling each of the chrominance components Cb, Cr at a rate of 6.75 MHz. Accordingly, 4:2:2 may represent the ratio of the frequencies of the single luminance channel top the two chrominance difference channels. In this regard, for every four (4) luminance samples, there may be two (2) samples chrominance samples.

Referring to FIG. 15, a 4:2:0 to 4:2:2 conversion may be performed for each of the fields independently. In MPEG video, chrominance may be 4:2:0 half sample both vertically and horizontally. Prior to performing IPC, the MPEG feeder may be adapted to convert the 4:2:0 sampled chrominance into 4:2:2 by interpolating chrominance samples vertically. Since the chrominance samples are also interlaced, they may have to be interpolated for each field independently.

In accordance with an embodiment of the invention, the following modifications may be done to the MPEG feeder in order to facilitate inter-operation with the IPC block. Firstly, separate base addresses may be required for both the top field and the bottom field. Secondly, it may be necessary to interleave the line access between the two fields. Thirdly, independent chrominance field interpolation may be required for both the top field and bottom field.

In a further embodiment of the invention, a playback engine may be required for IPC in a case where the video source may be captured from an analog input. Similar to the MPEG feeder, the playback engine may be required to read two separate fields and interlace them together. However, it may not be necessary to perform 4:2:0 to 4:2:2 conversion.

In accordance with the invention, a motion adaptive method based on color edge detection may be provided for converting an interlaced to a progressive scanned video. Advantageously, the IPC hardware may be integrated into a video network (VN) display controller, IC or chip without much difficulty. In this regard, at least some of the pertinent hardware may be implemented as a slab and inserted into a vertical scaler. The top level of the scaler may remain unchanged. The algorithm can be implemented using very little logic and a relatively small lookup table. Furthermore, no extra line buffers may be required since line buffers may be sharing with a high definition (HD) scaler. A HD scaler is a scaler that may be suitably adapted for high definition display output. The invention provides a superior de-interlacing quality when compared to field interpolation and at least comparable quality when compared to a 9-tap median filter. The invention also provides a robust approach to de-interlacing. In this regard, de-interlacing may be adapted to err on the safe side and in cases where there may be a failure to de-interlace motion artifacts, the IPC in accordance with the invention gracefully degrades to field interpolation.

Figure 16:
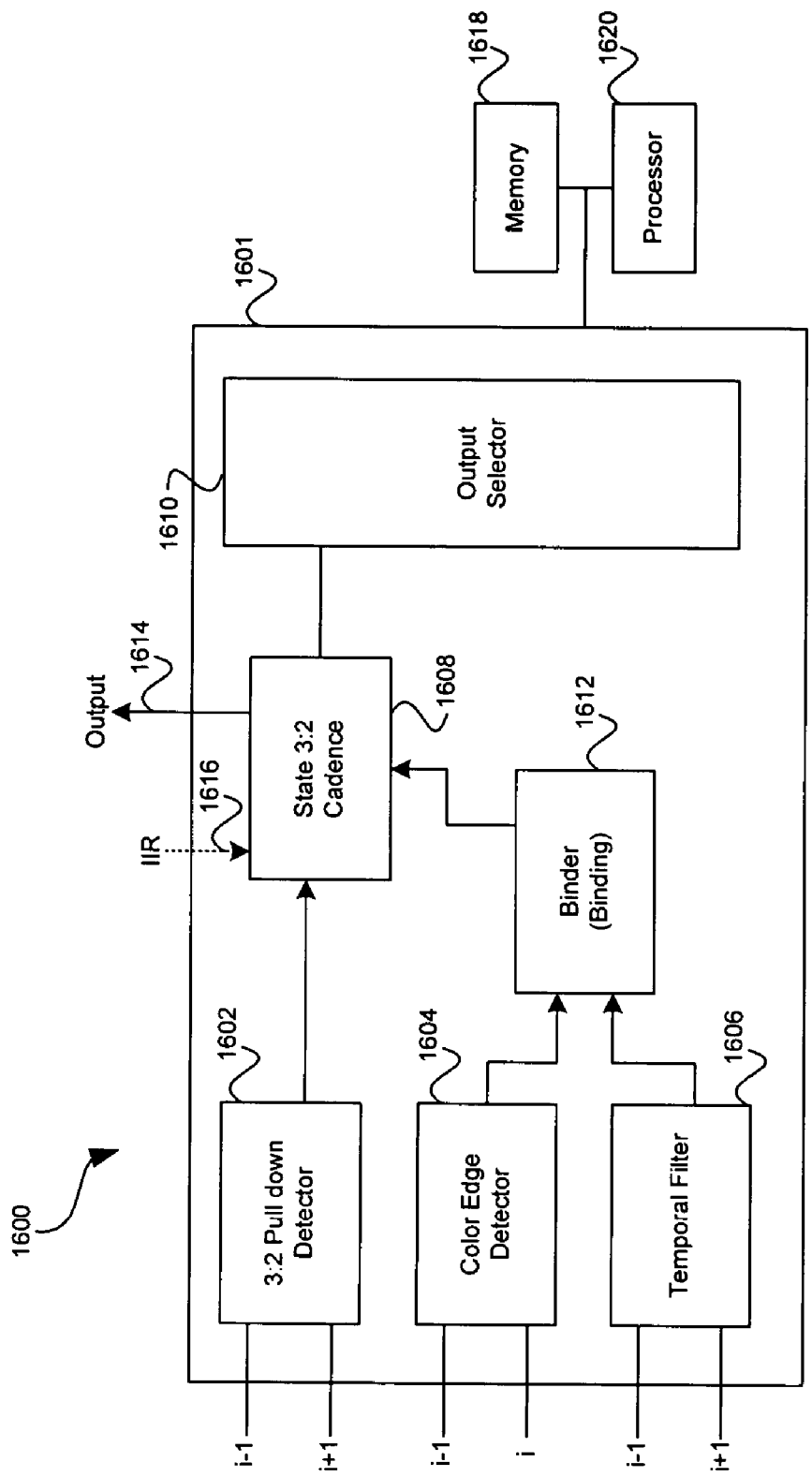
FIG. 16 is a block diagram of an exemplary three-field (3-field) interlace to progressive converter 1601 in accordance with an embodiment of the invention.

Another embodiment of the invention provides a three-field (3-field) interlace to progressive converter. FIG. 16 is a block diagram 1600 of an exemplary three-field (3-field) interlace to progressive converter 1601 in accordance with an embodiment of the invention. Referring to FIG. 16, there is shown a 3:2 pull down detector block 1606, a color edge detector block 1604, a 3:2 cadence block 1608, an output selector block 1610 and a binder block 1612. The color edge detector block 1604 may be a 3D color edge detector. The three-field (3-field) interlace to progressive converter 1601 may be coupled to a processor block 1620 and memory block 1618. The binding block 1612 may include suitable logic and/or circuitry that may be adapted to combine the output of the color edge detector block 1604 and the temporal filter block 1606.

The color edge detector block 1604 may be coupled to receive and process values corresponding fields i and i−1, where i represents a current field. The 3:2 pull down block 1602 may be coupled to receive and process values corresponding to fields i−1 and i+1. The temporal filter block 1606 may be coupled to receive and process values corresponding to fields i−1 and i+1. An output generated by the color edge detector 1604 and the temporal filter block 1606 may be supplied to the binder block 1612 for binding. An output generated by the 3:2 pull down detector block may be supplied to the state 3:2 cadence block 1608 for processing. The output generated by the binder block 1612 may be supplied to the state 3:2 cadence block 1608 for processing. The state 3:2 cadence block 1608 processes outputs from the 3:2 pull down detector block 1602 and the binder block 1612.

The output selector block 1610 may include suitable hardware and/or software that may facilitate selection of an appropriate output signal 1614 that may be generated by the state 3:2 cadence block 1608. In this regard, the output selector block 1610 may select between a normal de-interlaced output and a 3:2 cadence output. The output selector block 1610 may be configured to select between the normal de-interlaced output and the 3:2 cadence output in order to generate the best possible output from the three-field (3-field) interlace to progressive converter. The state of the 3:2 pull down cadence block, scene changes and motion statistics may be controlled by the output selector block 1610 and/or the processor 1620.

The three-field (3-field) interlace to progressive converter utilizes three (3) fields in order to perform color edge detection, temporal motion estimation and/or 3:2 pull down. In one embodiment of the invention, the three-field (3-field) interlace to progressive converter may simultaneously perform color edge detection, temporal motion estimation and/or 3:2 pull down.

FIG. 17a is a block diagram 1700 illustrating the organization of the fields utilized for the three-field (3-field) interlace to progressive conversion of FIG. 16 in accordance with an embodiment of the invention. Referring to FIG. 17a, there is shown a top field $T_i$, a first bottom field $B_{i-1}$ and a second bottom field $B_{i+1}$. The top field $T_i$ is the current field. The interpolated field 1702 is the field of opposite polarity. In operation, the interpolated field 1702 may be generated by the three-field (3-field) interlace to progressive conversion using the current or top field $T_i$, the first bottom field $B_{i-1}$ and a the second bottom field $B_{i+1}$ in accordance with an embodiment of the invention.

FIG. 17b is a block diagram 1750 illustrating another organization of the fields utilized for the three-field (3-field) interlace to progressive conversion of FIG. 16 in accordance with an embodiment of the invention. Referring to FIG. 17b, there is shown a first top field $T_i$, a second top field $T_{i+1}$ and a bottom field $B_i$. The bottom field $B_i$ is the current field. The interpolated field 1752 is the field of opposite polarity. In operation, the interpolated field 1752 may be generated by the three-field (3-field) interlace to progressive conversion using the current or top field $B_i$, the first top field $T_{i-1}$ and a the second top field $T_{i+1}$.

Referring to FIG. 16, the fields before and after the current field may be deinterlaced at the same time. This permits the output selector 1610 to seamlessly switch between a de-interlacing mode and a reverse 3:2 pull down mode of operation. If the current field is $T_i$, color edge detection may be applied to $T_i$ and $B_{i-1}$ and the temporal filter may be applied to $B_{i-1}$ and $B_{i+1}$. Simultaneously, 3:2 pull down detection may be applied to $B_{i-1}$ and $B_{i+1}$. If the current filed is a bottom field Bi, then the opposite fields may be utilized during the three field interlace to progressive scan conversion. In this regard, if the current field is $B_i$, color edge detection may be applied to $B_i$ and $T_{i-1}$ and the temporal filter may be applied to $T_{i-1}$ and $T_{i+1}$. Simultaneously, 3:2 pull down detection may be applied to $B_{i-1}$ and $B_{i+1}$.

In another aspect of the invention, in instances where sufficient bandwidth may be available, an infinite impulse response (IIR) filter may be utilized as the temporal filter block 1606. Intermediate results generated by the IIR filter may be stored in a memory block 1618, for example. The processor 1620 may utilize the intermediate results stored in the memory block 1618 for computation for the current field and a newly generated result may be stored in the memory block 1618. The newly generated result may be stored in the memory block 1618 as a new intermediate result.

In summary, interlaced to progressive scan conversion may include simultaneously performing 3:2 pull down detection, color edge detection and temporal filtering on a first field, a second field and a third field. Outputs generated by the color edge detection and the temporal filtering may be bound to generate a bound output. An output generated from the 3:2 pull down detection and the bound output may be 3:2 cadence processed to achieve the interlace to progressive conversion. A selector may select between a filtered deinterlaced output and a reverse 3:2 pull down output.

Interlaced to progressive scan conversion may also include simultaneously performing 3:2 pull down detection, color edge detection and temporal filtering on a first field, a second field and a third field. Outputs generated from the color edge detection and the temporal filtering may be bound to create a bound output. The bound output and an output generated from the 3:2 pull down detection may be 3:2 cadence processed to achieve the interlace to progressive conversion. A selector may be utilized to select between a filtered deinterlaced output and a reverse 3:2 pull down output generated by the interlaced to progressive scan conversion in accordance with the invention.

The first field may be a current field. Color edge detection may be performed on the first and the second fields. The third and second fields may be temporally filtered or infinite impulse response filtered. Additionally, 3:2 pull down detection may be performed on the second and third fields. In instances where the first field is a top field, then the second field may be a corresponding prior bottom field with respect to the top field and the third field may be a corresponding successive bottom field with respect to the top field. Similarly, in instances where the first field is a bottom field, then the second field is a corresponding prior top field with respect to the bottom field and the third field is a corresponding successive top field with respect to the bottom field.

Accordingly, the present invention may be realized in hardware, software, or a combination of hardware and software. The present invention may be realized in a centralized fashion in one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for converting interlaced formatted video to progressive scan video, the method comprising:
   simultaneously performing 3:2 pull down detecting, color edge detecting and temporal filtering on a first field, a second field and a third field;
   binding an output result from said color edge detecting and from said temporal filtering to generate a bound output; and
   3:2 cadence processing said bound output and an output generated from said 3:2 pull down detection.

2. The method according to claim 1, further comprising selecting between a filtered deinterlaced output and a reverse 3:2 pull down output.

3. The method according to claim 1, wherein said first field is a current field.

4. The method according to claim 1, further comprising temporal filtering said third and said second fields.

5. The method according to claim 1, further comprising infinite impulse response filtering said third and said second fields.

6. The method according to claim 1, further comprising performing said color edge detection on said first and said second fields.

7. The method according to claim 1, further comprising performing said 3:2 pull down detection on said second and said third fields.

8. The method according to claim 1, wherein if said first field is a top field, then said second field is a corresponding prior bottom field with respect to said top field and said third field is a corresponding successive bottom field with respect to said top field.

9. The method according to claim 1, wherein if said first field is a bottom field, then said second field is a corresponding prior top field with respect to said bottom field and said third field is a corresponding successive top field with respect to said bottom field.

10. A machine-readable storage, having stored thereon a computer program having at least one code section for converting interlaced formatted video to progressive scan video, the code sections executable by a machine for causing the machine to perform the steps comprising:
    simultaneously performing 3:2 pull down detecting, color edge detecting and temporal filtering on a first field, a second field and a third field;
    binding an output result from said color edge detecting and from said temporal filtering to generate a bound output; and
    3:2 cadence processing said bound output and an output generated from said 3:2 pull down detection.

11. The machine-readable storage according to claim 10, further comprising code for selecting between a filtered deinterlaced output and a reverse 3:2 pull down output.

12. The machine-readable storage according to claim 10, wherein said first field is a current field.

13. The machine-readable storage according to claim 10, further comprising code for temporal filtering said third and said second fields.

14. The machine-readable storage according to claim 10, further comprising code for infinite impulse response filtering said third and said second fields.

15. The machine-readable storage according to claim 10, further comprising code for performing said color edge detection on said first and said second fields.

16. The machine-readable storage according to claim 10, further comprising code for performing said 3:2 pull down detection on said second and said third fields.

17. The machine-readable storage according to claim 10, wherein if said first field is a top field, then said second field is a corresponding prior bottom field with respect to said top field and said third field is a corresponding successive bottom field with respect to said top field.

18. The machine-readable storage according to claim 10, wherein if said first field is a bottom field, then said second field is a corresponding prior top field with respect to said bottom field and said third field is a corresponding successive top field with respect to said bottom field.

19. A system for converting interlaced formatted video to progressive scan video, the system comprising:
    a 3:2 pull down detector coupled to a 3:2 cadence processor;
    a color edge detector coupled to a binder;
    a filter coupled to said binder, said binder coupled to said 3:2 cadence processor; and
    an output selector coupled to said 3:2 cadence processor.

20. The system according to claim 19, further comprising a memory coupled to at least one of said 3:2 pull down detector, said 3:2 cadence processor, said color edge detector, said binder, said filter and said output selector.

21. The system according to claim 20, further comprising at least one processor coupled to said memory and said at least one of said 3:2 pull down detector, said 3:2 cadence processor, said color edge detector, said binder, said filter and said output selector.

22. The system according to claim 19, wherein said filter is one of a temporal filter and an infinite impulse response filter.

* * * * *